United States Patent [19]

Koga

[11] Patent Number: 5,204,771
[45] Date of Patent: Apr. 20, 1993

[54] OPTICAL CIRCULATOR

[75] Inventor: Masafumi Koga, Yokosuka, Japan

[73] Assignee: Nippon Telegraph and Telephone Corporation, Tokyo, Japan

[21] Appl. No.: 807,240

[22] Filed: Dec. 16, 1991

[30] Foreign Application Priority Data

Dec. 17, 1990 [JP] Japan .................. 2-402944
Jun. 17, 1991 [JP] Japan .................. 3-144984

[51] Int. Cl.$^5$ .................. G02F 1/09; G02B 27/28
[52] U.S. Cl. .................. 359/281; 359/282; 359/484; 359/495; 359/496
[58] Field of Search .................. 359/281, 282, 283, 484, 359/494, 495, 496, 499; 385/6, 11

[56] References Cited

U.S. PATENT DOCUMENTS

| 4,178,073 | 12/1989 | Uchida et al. | 359/484 |
| 4,272,159 | 6/1981 | Matsumoto | 359/484 |
| 4,650,289 | 3/1987 | Kuwahara | 359/484 |
| 4,988,170 | 1/1991 | Buhrer | 359/499 |
| 4,991,938 | 2/1991 | Buhrer et al. | 359/499 |

FOREIGN PATENT DOCUMENTS 58-28561 6/1983 Japan .

OTHER PUBLICATIONS

T. Matsumoto et al, "Polarization-independent optical circulator: an experiment," Applied Optics, vol. 19, No. 1, Jan. 1, 1980, pp. 108-112.
M. Koga et al, "Multi/Demultiplexer Using a 4-port Optical Circulator and Interference Filters," The Transactions of the IEICE, vol. E72, No. 10, Oct., 1989, pp. 1086-1088.

Primary Examiner—Martin Lerner
Attorney, Agent, or Firm—Finnegan, Henderson, Farabow, Garrett & Dunner

[57] ABSTRACT

The optical circulator according to the present invention comprises three birefringent crystal plates 22, 23, and 24; reciprocal and non-reciprocal rotators 25 of the first group inserted between birefringent crystal plates 22 and 23; reciprocal and non-reciprocal rotators 26 of the second group inserted between birefringent crystal plates 23 and 24; and more than two beam incoming and outgoing ports 27, 28, and 29. The rotating directions of the reciprocal and non-reciprocal rotators 25 of the first group are so set that the directions in which ordinary beam and extraordinary beam are separated on the birefringent crystal plates differ among birefringent crystal plate 23 and birefringent crystal plates 22 and 24, and the electric field vibration directions of the beams agree at birefringent crystal plate 23. The rotating directions of the reciprocal and non-reciprocal rotators 26 of the second group are set so that the polarization face of the beams are perpendicular to each other at birefringent crystal plate 24. According to the above optical circulator, there is no need to use angular prisms or polarization beam splitters as have been required till now.

14 Claims, 31 Drawing Sheets

OPTICAL CIRCULATOR

BACKGROUND OF THE INVENTION

1. Field of the Invention

The present invention relates to an optical circulator used in optical communications.

2. Prior Art

Non-reciprocal circuits have been used for some time as isolators and circulators, to construct a microwave circuit in microwave regions. This non-reciprocal circuit was introduced theoretically in 1984, its first realization being a microwave gyrator developed in 1952. Thereafter, research has led to a variety of application developments. The above isolator has been used either to isolate oscillators from loads so as to offer smooth operation, or to remove acoustic distortion in signal waves transmitted over a long distance of transmission path. The circulator has also been used in transmitting and receiving common circuits and partial wave circuits.

Such a non-reciprocal circuit can naturally be used in the area of optical wave communications as in microwaves. For instance, an optical isolator has already been in use to prevent noise caused by light returning from a reflecting point back to oscillation sources or optic amplifiers.

A specific example of the above optical isolator is given in FIGS. 1(A) and (B). In this optical isolator, a light injected from a first light incoming and outgoing port consisting of an optical fiber 201 converges and forms an image through a lens 202, and passes through a flat double refraction crystal 203. As a result of passing through the flat double refraction crystal 203, an extraordinary light is displaced, and the extraordinary light and ordinary light proceed on different paths and enter a magnetic optic material 204. Then, the extraordinary and ordinary lights rotate clockwise as much as 90° at the magnetic optic material 204, and a crystal 205, which has optical rotary power or anisotropy, and are injected into the double refraction crystal 206. The extraordinary light is displaced again when passing through the double refraction crystal 206, hence the polarization center points of both lights finally coincide, and enter the second incoming and outgoing port consisting of an optical fiber 207 without a loss.

Next, an explanation is given on a light that proceeds from the optical fiber 207 to an optical fiber 201. Because the magnetic optic material 204 has directionality, it is rotated for a change of as much as 45° counterclockwise relative to the proceeding direction of the light in this case. Therefore, the polarization centers of the extraordinary and ordinary lights neither coincide nor enter the optical fiber. In the meantime, the detail of this isolator is disclosed in Patent Publication No. Sho-58-28561.

In addition, the optical circulator, though not having reached a stage of practical use, may be applied in microwave applications, and is likely to be used as an optical circulator now that optic amplifiers have become practical.

For specific examples of such optical circulators, optical circulators 1 are proposed as shown in FIGS. 1 and 2.

Such optical circulators 1 are shown, for example, in the following theses: T. Matsumoto et al, "Polarization-independent optical circulator: an experiment, Appl. Opt. Vol. 19, No. 1, pp. 108–112, 1980; and M. Koga et al., "Multi-Demultiplexer Using a 4-port Optical Circulator and Interference Filters", The Trans. IEICE of Japan, Vol. E72, No. 10, pp. 1086–1088, 1989. These circulators comprise polarization beam splitters 2 and 3; angular prisms 4 and 5; 45° quartz rotators 6 and 7; 45 Faraday rotators 8 and 9; and light incoming and outgoing ports 11 through 14.

In the optical circulator 1, a light Li injected from a light incoming and outgoing port 11 is divided into a P-wave content (L1) and an S-wave content (L2) by a polarization beam splitter 2, as shown in FIG. 2. The P-wave content (L1), as a result of transmitting through the 45° quartz rotator 6 and 45° Faraday rotator 8, has its electrical field vibration direction rotated by 90°, is reflected by the angular prism 5, and injected into the polarization beam splitter 3. The S-wave content (L2), as a result of being reflected by the angular prism 4 and transmitting through the 45° quartz rotator 7 and 45° Faraday rotator 9, has its electrical field vibration direction rotated by 90°, and is injected into the polarization beam splitter 3. The P-wave content (L1) and S-wave content (L2) are combined by the polarization beam splitter 3, and the combined light Lf goes out from the light incoming and outgoing port 12.

Also as shown in FIG. 3, the light Li injected from a light incoming and outgoing port 12 is divided into a P-wave content (L3) and an S-wave content (L4) by a polarization beam splitter 3. The P-wave content (L3) transmits through the 45° Faraday rotator 9 and 45° quartz rotator 7, and is then reflected by the angular prism 4 and injected into the polarization beam splitter 2. On the one hand, the S-wave content (L4) is reflected by the angular prism 5, and transmits through the 45° Faraday rotator 8 and 45° quartz rotator 6, and is injected into the polarization beam splitter 2. The P-wave content (L3) and S-wave content (L4) are combined by the polarization beam splitter 2, and the combined light Lf passes out from the light incoming and outgoing port 13. In this case, the light directions of the P-wave content (L3) and S-wave content (L4) are opposite to those of the said P-wave content (L1) and S-wave content (L2), so the electrical field vibration directions will not rotate even when passing through the two reciprocal and non-reciprocal rotators.

As explained above, the optical circulator 1 can perform a non-reciprocal operation such that the light Li injected from the light incoming and outgoing port 11 passes out from the light incoming and outgoing port 12, and the light Li injected from the light incoming and outgoing port 12 passes out from the light incoming and outgoing port 13 rather than from the light incoming and outgoing port 11.

The above optical isolator normally has two light incoming and outgoing ports, wherein the light injected from the first light incoming and outgoing port passes out from the second light incoming and outgoing port. However, the light conversely injected from the second light incoming and outgoing port will not pass out from the first light incoming and outgoing port. Therefore, it is very difficult to save and utilize the light injected from the second light incoming and outgoing port, as bidirectional communication medium without wasting.

In addition, the optical circulator 1 has an advantage of effectively utilizing the light Li injected from the light incoming and outgoing port 12, as bidirectional communication medium by means of leading the light to the incoming and outgoing port 13, but at the same time has a drawback in that, because the optical circulator 1 is basically constructed of the polarization beam splitters 2 and 3 and angular prisms 4 and 5 as explained above, the isolation cannot be increased when the polarization beam splitters 2 and 3 are used. The reason for this is that it is technically difficult to suppress to 30 dB or lower the isolation quantity of P-wave content to be transmitted that leaks into the S-wave content to be reflected by the polarization beam splitters 2, 3.

Furthermore, when the angular prisms 4 and 5 are used, there is a disadvantage in that high-level technology is required to optically link the incoming and outgoing port 11 with 12 (11 with 13). For instance, the S-wave content (L1) and P-wave content (L2) that have been divided by the polarization beam splitter 2 must have its direction changed by the angular prisms 4 and 5, and again must be combined by the polarization beam splitter 3. Therefore, the angular prisms 4 and 5 must be mounted upon adjusting their angles at a high accuracy so that the proceeding directions of the combined S-wave content and P-wave content may be coincided as close as possible. Since these angles need be adjusted in a second-order accuracy in the case of, for example, the incoming and outgoing ports 11, . . . in single mode wave guide path, the angle at the reflecting face must provide second-order accuracy in fabricating the angular prisms 4 and 5. Thus, the optical circulator 1 has a disadvantage in that it requires a very high level optical linking technique.

SUMMARY OF THE INVENTION

Therefore, the present invention was made in light of the above problems, and is intended to provide an optical circulator capable of effectively utilizing all light injected from multiple incoming and outgoing ports, as bidirectional communication medium without wasting, capable of elevating an isolation between the incoming and outgoing ports, and capable of facilitating its manufacture including that of the optical linking.

The present invention, therefore, provides an optical circulator for transmitting lights from the incoming and outgoing ports circularly, said optical circulator comprising: a first dividing and combining means for dividing a beam into two beams of orthogonal electric field vectors and for combining two beams of orthogonal electric field vectors from different paths into one on the same path; a beam path determining means for introducing a beam to a different direction depending on the direction of the electric field vector and the propagation; and a second dividing and combining means for dividing a beam into two beams of orthogonal electric field vectors and for combining two beams of orthogonal electric field vectors from different paths into one on the same path, said first dividing and combining means, said beam path determining means and said second dividing and combining means being disposed along the direction of propagation of the incoming beam at predetermined intervals; a first polarization rotating means for disposing between said first dividing and combining means and said beam path determining means to making two orthogonal polarization components parallel or the two parallel components orthogonal to one another; and a second polarization rotating means for disposing between said beam path determining means and said second dividing and combining means for making two orthogonal polarization components parallel or the two parallel components orthogonal to one another.

As explained above, according to the present invention, an optical circulator, in which a light injected from a predetermined position in the first dividing and combining means passes out from a predetermined position in the second dividing and combining means; and a light injected from the predetermined position passes out from another position in the first dividing and combining means, can be easily fabricated to include optical linking, and all light injected from multiple incoming and outgoing ports can be effectively utilized without being discarded, and the isolation between the incoming and outgoing ports can be elevated.

DETAILED DESCRIPTION OF PREFERRED EMBODIMENTS

Explanations of each embodiment of the present invention are given below with reference to the drawings.

The First Embodiment

Figure 1A:
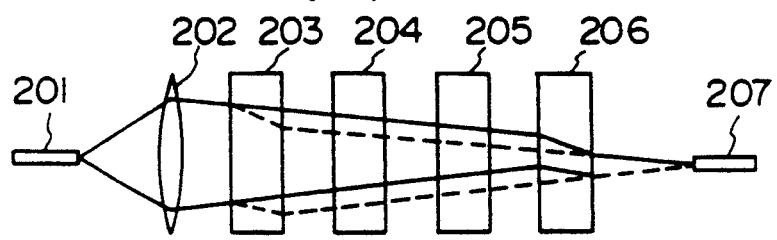
FIGS. 1(A) and (B) are drawings showing the configuration and operation of a conventional optical isolator, respectively.
Figure 1B:
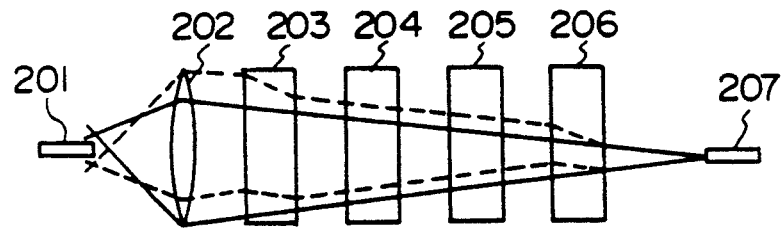
Figure 2:
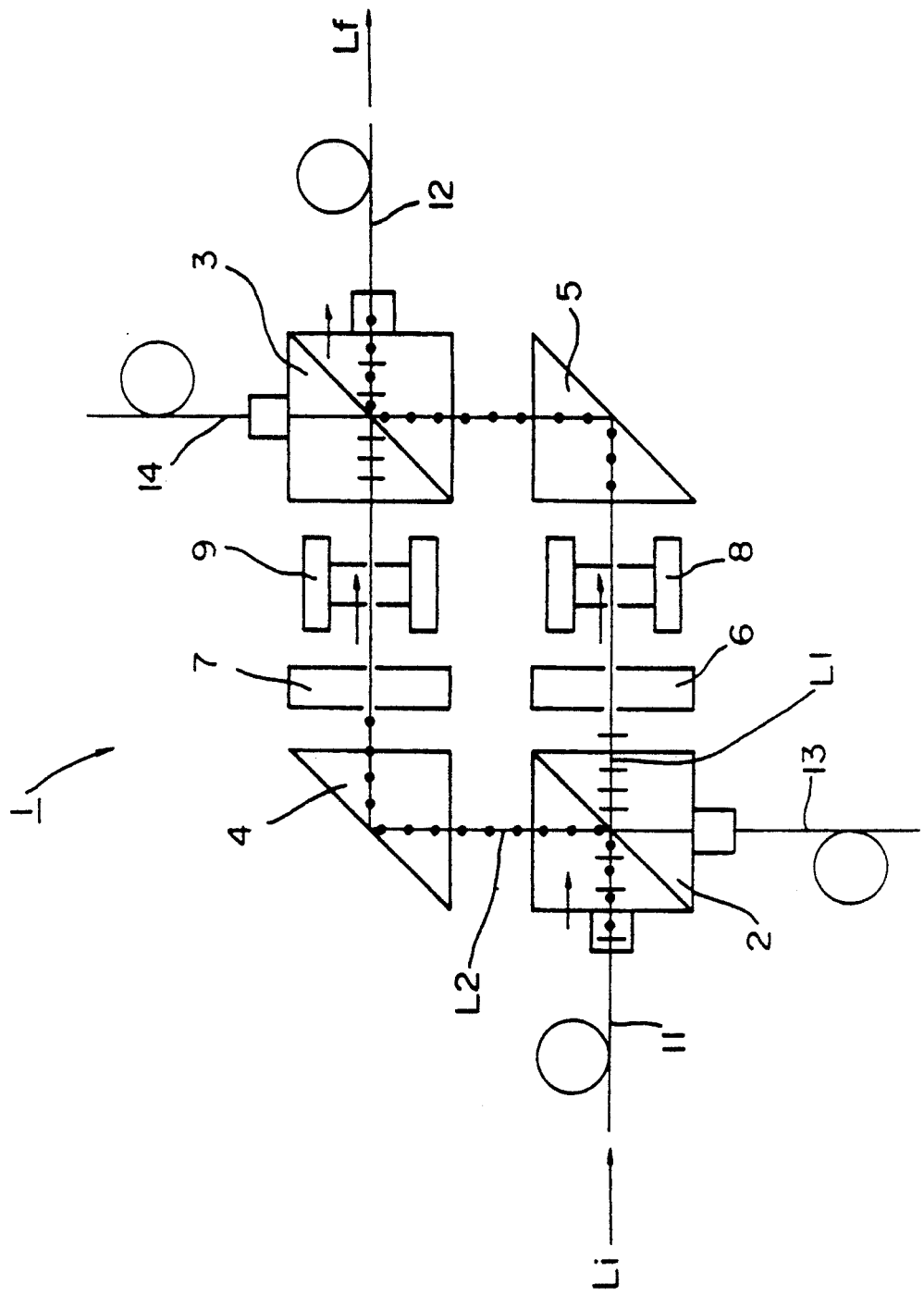
FIG. 2 is a drawing showing the configuration and operation of a conventional optical circulator.
Figure 3:
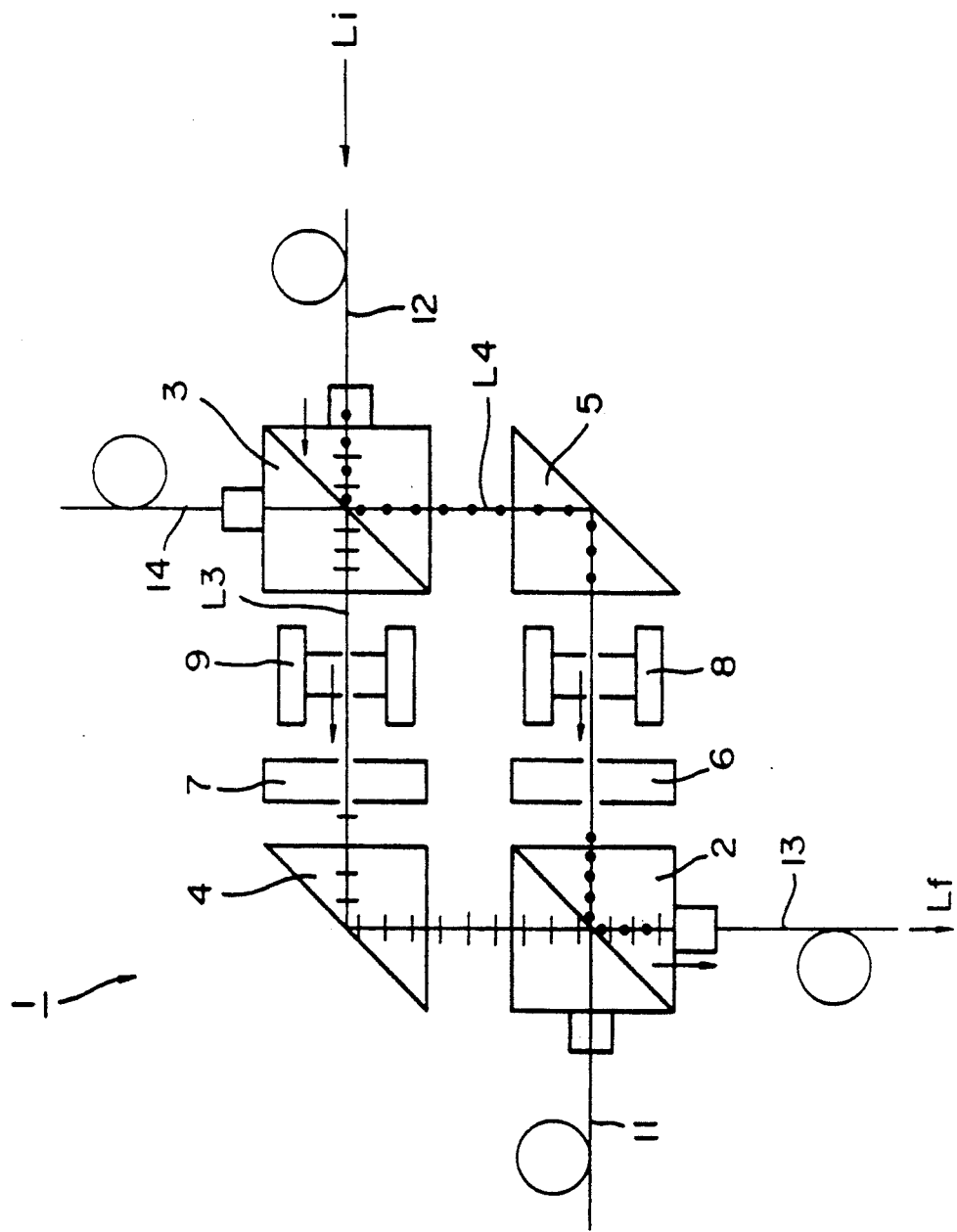
FIG. 3 is a drawing showing the configuration and operation of a conventional optical circulator.
Figure 4:
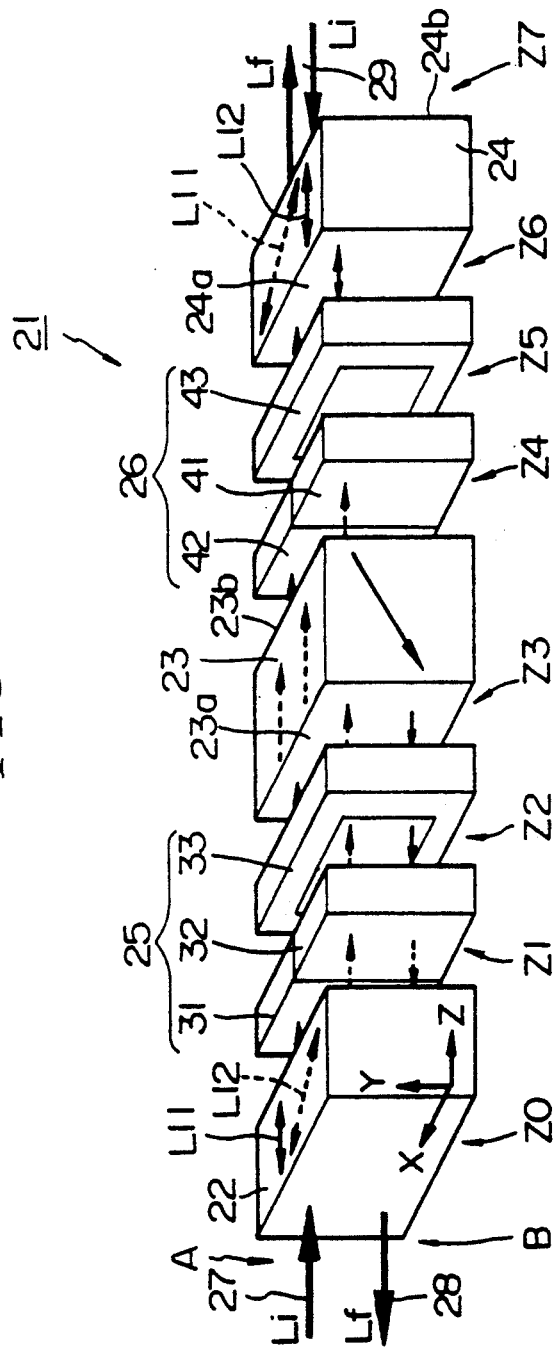
FIG. 4 is a perspective view showing a sample configuration of an optical non-reciprocal circuit according to the first embodiment of the present invention.

First, the optical circulator in the first embodiment is explained referring to FIG. 4.

This optical circulator 21 is constructed of a first through third double refraction crystal plates 22 through 24 disposed along the proceeding direction of light with a predetermined interval; a rotator 25 of the first group inserted between the first double refraction crystal plate 22 and the second refracted crystal plate 23; a rotator 26 of the second group inserted between the second double refraction crystal plate 23 and the third refracted crystal plate 24; light incoming and outgoing ports 27 and 28 disposed on the first double refraction crystal plate 22; and a light incoming and outgoing port 29 disposed on the third double refraction crystal plate 24. The rotator 25 of the first group consists of reciprocal and non-reciprocal rotators that rotate electric field vibration directions of light up to an identical angle; a first reciprocal rotator rotates clockwise to 45° (hereinafter simply referred to the first reciprocal clockwise rotator) 31, and a first reciprocal rotator rotates counterclockwise to 45° (hereinafter simple referred to as the first reciprocal counterclockwise rotator) 32, and a first non-reciprocal rotator rotates to 45° (hereinafter simply referred to the first non-reciprocal rotator) 33.

The rotator 26 of the second group is constructed similarly to rotator 25 of the first group, comprising a second reciprocal rotator rotating clockwise to 45° (hereinafter simply referred to the second reciprocal clockwise rotator) 41, a second reciprocal rotator rotating counterclockwise to 45° (hereinafter simply referred to the second reciprocal counterclockwise rotator) 42, and a second non-reciprocal rotator rotating to 45° (hereinafter simply referred to as the second non-reciprocal rotator) 43.

Referring to the figure, the configuration and operations will be explained using an oblique coordinate. The positive direction of the Z axis is the direction that goes from the side of the light incoming and outgoing ports 94 and 95 to the side of the light incoming and outgoing ports 96 and 97, this direction being from left to right in FIG. 11. The direction from bottom to top is the forward direction of the Y axis. The direction from the vertically upper section of the page to the vertically lower section is the positive direction of the X axis.

Calcite or rutile crystals are favorably used for the above double refraction crystal plate, and so are quartz light rotators or ½ wave length plates for the reciprocal rotator. A Faraday rotator using Y.I.G. crystal or Bi-added thick film crystals is used for non-reciprocal rotators. The composition of the Bi-added thick film crystals include a combination of, for example, $(YbTbBi)_3Fe_5O_{12}$ and $(GdBi)_3(FeAlGa)_5O_{12}$, or of Y.I.G. and $Y_{3-x}Bi_xFe_5O_{12}$. In the former combination, the Faraday rotation coefficient is 1,800 (deg/cm) and 1,300 (deg/cm). The change in sign indicates that the direction of rotation is reversed under the same magnetic field.

The direction that separates ordinary light and extraordinary light in the double refraction crystal plates 22, . . . of this optical circulator 21 is so set that the direction that the second double refraction crystal plate 23 separates differs from the directions the first double refracted crystal plate 22 and the third doubled refracted crystal plate 24 separate. The directions that the first double refraction crystal plate 22 and the third double refraction crystal plate 24 separate coincide.

The rotation direction respectively for the first reciprocal clockwise rotator 31, first reciprocal counterclockwise rotator 32, and first non-reciprocal rotator 33 is so set that the electric field vibration directions of the ordinary light and extraordinary light separated by the first double refraction crystal plate 22 coincide with each other at the edge 23a of the second double refraction crystal plate 23.

The rotation direction respectively for the second reciprocal clockwise rotator 41, second reciprocal counterclockwise rotator 42, and second non-reciprocal rotator 43 is so set that the polarization faces of the two lights coincided at the edge 23b of the second double refraction crystal plate 23 cross each other at right angles at the edge 24a of the third double refraction crystal plate 24.

Figure 5:
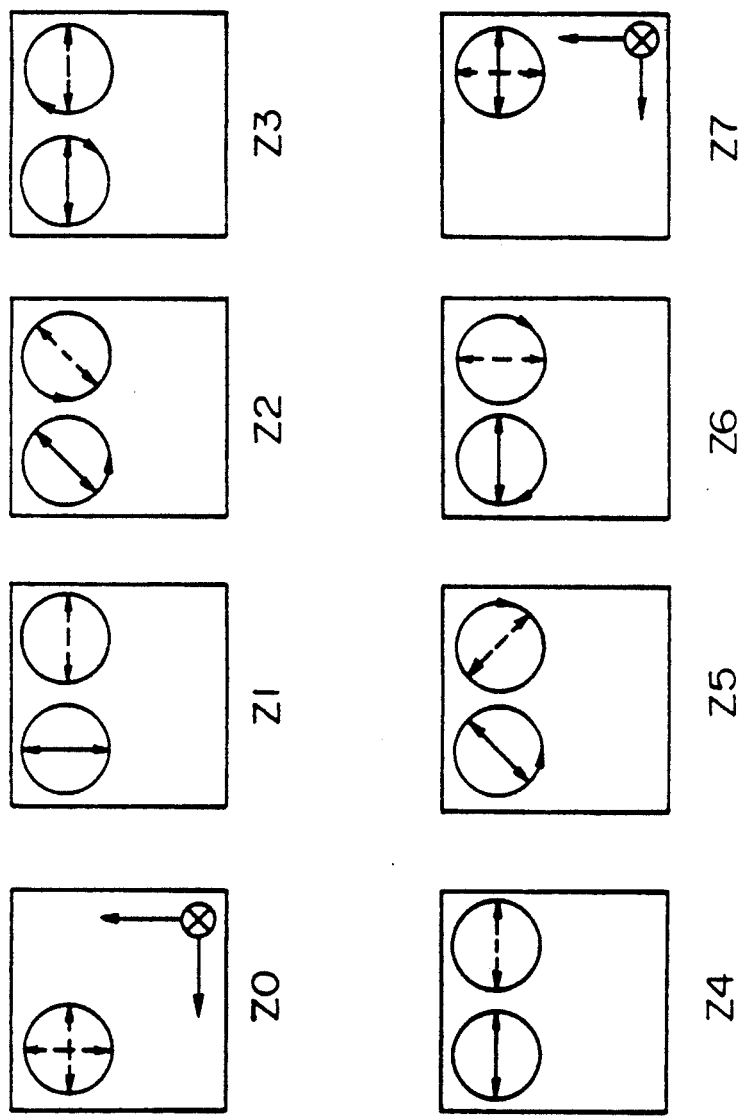
FIG. 5 is a drawing showing polarized light in a light path A according to the first embodiment of the present invention.

Next, operations of the optical circulator 21 are explained. FIG. 5 is a view of polarized light in light path A going from the light incoming and outgoing port 27 to the light incoming and outgoing port 29 as viewed from the side of the incoming light (the side of the light incoming and outgoing port 27). These states are indicated below as Z0 through Z7.

The light Li injected from the light incoming and outgoing port 27 is in a state of Z0, and is separated into the light L11 and light L12 on the X-Z plane by the first double refraction crystal plate 22. The light L11 is ordinary light (O-ray) relative to the first double refraction crystal plate 22, and the light L12 is extraordinary light (E-ray). The light is polarized at right angles and vibrates in the X and Y directions as shown by Z1.

The electric field vibrations of light L11 and light L12, which are perpendicular to each other, proceed in the same direction as a result of the light L11 (L12) passing through the first reciprocal clockwise rotator 31 (first reciprocal counterclockwise rotator 32). In this case, the first reciprocal clockwise rotator 31 is rotating clockwise as viewed from the injection direction of the light L11, and the first reciprocal counterclockwise rotator 32 is rotating counterclockwise as viewed from the injection direction of the light L12. The state of polarization at this time is as shown by Z2. Next, as a result of the first non-reciprocal rotator 33 rotating the light L11 and light L12 further clockwise by 45°, the vibrations of the lights L11 and L12 proceed in the X direction. The result is that light L11 is rotated by 90° and light L12 is not rotated. The second double refraction crystal plate 23 is so arranged that the two lights L11 and L12 vibrating in the X direction become ordinary light. The two lights L11 and L12 that passed the second double refraction crystal plate 23 (in a Z4 state) will pass the rotator 26 of the second group. In this case, the light L11 will have its rotation in the direction of polarization offset by virtue of having passed through the second reciprocal counterclockwise rotator 42 and the second non-reciprocal rotator 43. As a result, the direction of polarization will not rotate. The light L12 will have its direction of polarization rotated clockwise by 45° by virtue of having passed through the second reciprocal clockwise rotator 41 and the second non-reciprocal rotator 43. As a result, the direction of polarization will be rotated by 90° (Z6 state). Therefore, the vibrations of the two lights L11 and L12 cross perpendicularly at the injection edge face 24a of the third double refraction crystal plate 24.

The two lights L11 and L12, with L11 becoming extraordinary light and L12 becoming ordinary light relative to the third double refraction crystal plate 24, spatially coincident at the edge face 24b of the third double refraction crystal plate 24, are combined (light Lf), and propagate in the Z direction.

Figure 6:
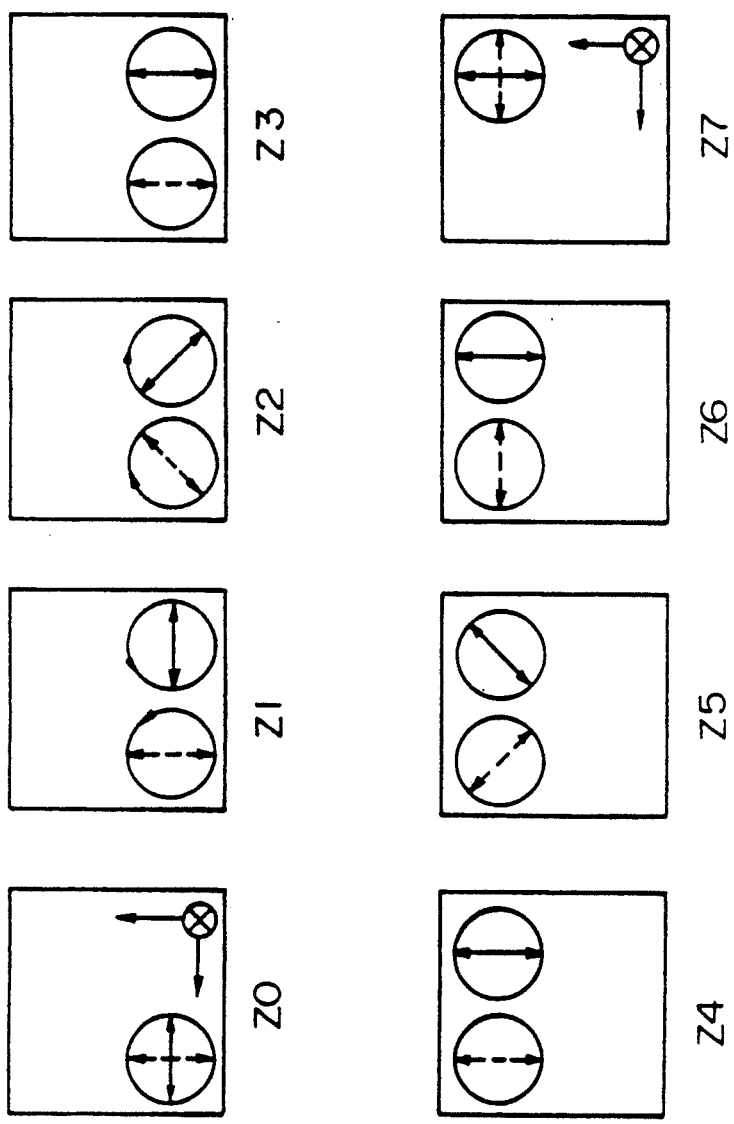
FIG. 6 is a drawing showing polarized light in a light path B according to the first embodiment of the present invention.

Next, FIG. 6 is a view of polarized light at light path B going from the light incoming and outgoing port 29 to the light incoming and outgoing port 28 as viewed from the side of the outgoing light (the side of the light incoming and outgoing port 28).

The light Li injected from the light incoming and outgoing port 29 is in a Z7 state, and is separated into light L11 and light L12 on the X-Z plane by the third double refraction crystal plate 24. The light L11 is extraordinary light (E-ray) relative to the third double refraction crystal plate 24, and the light L12 is ordinary light (O-ray). Each light is polarized at right angles, vibrating in the X and Y directions as shown by Z6.

Thereafter, the two lights L11 and L12 (in state Z6) will pass through the rotator 26 of the second group. The light L11 will have its direction of polarization rotated clockwise by 45° as viewed from the outgoing side when passing through the second non-reciprocal rotator 43 and the second reciprocal counterclockwise rotator 42. As a result, the direction of polarization will be rotated by 90°. But the light L12 will have its rotation in the direction of polarization offset when it passes through the second non-reciprocal rotator 43 and the second reciprocal clockwise rotator 41. As a result, the direction of polarization will not rotate (state Z4).

Therefore, the electric fields of the two lights L11 and L12 vibrate in the Y direction at the edge face 23b of the second double refraction crystal plate 23, unlike with what takes place in light path A. Because this direction becomes an extraordinary light relative to the second double refraction crystal plate 23, the lights L11 and L12 move downward as they pass through the second double refracted plate 23.

Having moved downward, the two lights L11 and L12 receive action reverse to the wave polarization at light path A as they pass through the rotator 25 of the first group. In this case, the light L11 will have its rotation in the direction of polarization offset when passing through the first non-reciprocal rotator 33 and the first reciprocal clockwise rotator 31. As a result, the direction of polarization will not rotate. However, the light L12 will have its direction of polarization rotated counterclockwise by 45° when it passes through the first non-reciprocal rotator 33 and the first reciprocal counterclockwise rotator 32. As a result, the direction of polarization will rotate by 90° (state Z1). Therefore, the polarized state of light path B will have a different light path the same way as in light path A at the incoming edge face of the first double refraction crystal plate 22. Therefore, the light Li injected from the light incoming and outgoing port 29 will not pass out from the light incoming and outgoing port 27, but from the light incoming and outgoing port 28.

As explained above, according to this optical circulator 21, a non-reciprocal circuit can be realized such that the light Li injected from the light incoming and outgoing port 27 will pass out from the light incoming and outgoing port 29, and the light Li injected from the light incoming and outgoing port 29 will not pass out from the light incoming and outgoing port 27, but from the light incoming and outgoing port 28.

The clockwise and counterclockwise rotations explained above may be realized by either the reciprocal rotator or non-reciprocal rotator. In addition, in non-reciprocal Faraday rotation, it is possible to alter the rotation direction by means for changing the direction of the magnetic force.

Figure 7:
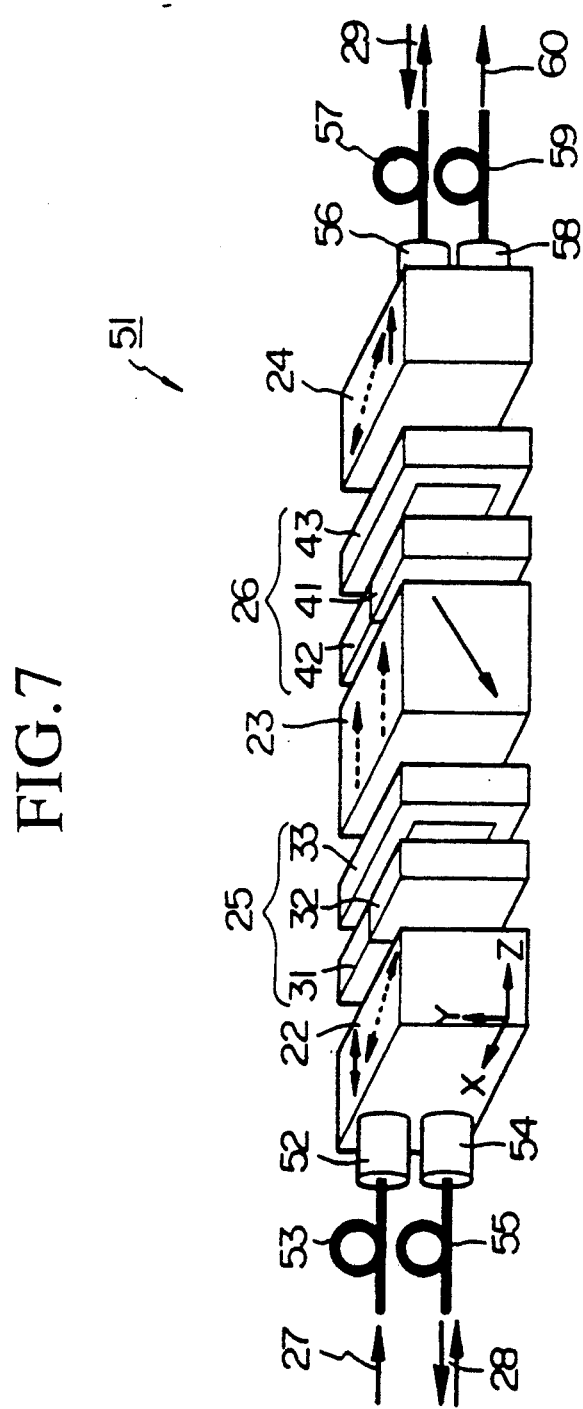
FIG. 7 is a perspective view showing a variant on the optical circulator of the present invention according to the first embodiment of the present invention.

FIG. 7 shows variant of the above optical circulator 21. The difference in this optical circulator 51 from the above optical circulator 21 is that a lens 52 and an optic fiber 53 are disposed coaxially between the first double refraction crystal plate 22 and the light incoming and outgoing port 27; a lens 54 and an optic fiber 55 are disposed coaxially between the first double refraction crystal plate 22 and the light incoming and outgoing port 28; a lens 56 and an optic fiber 57 are disposed coaxially between the third double refraction crystal plate 24 and the light incoming and outgoing port 29; and further, a fourth port is disposed in which a lens 58, an optic fiber 59, and a light incoming and outgoing port 60 are coaxially joined to the third double refraction crystal plate 24.

This optical circulator 51 also provides the same operations and effects as by the optical circulator 21. An optical circulator can thus be realized such that the light Li injected from the light incoming and outgoing port 28 will go out from the light incoming and outgoing port 60, and the light Li injected from the light incoming and outgoing port 29 will not go out from the light incoming and outgoing port 27, but from the light incoming and outgoing port 28.

Thus, in the above-mentioned optical circulators 21 and 51, the number of light incoming and outgoing ports should not be limited to those given in the above embodiments, but may be changed as needed.

Further, the optic fibers 53, . . . are of course capable of being replaced with light wave guide paths that can capture light energy and transmit it. These optic fibers 53, . . . may have either a single mode or a number of modes.

The Second Embodiment

Figure 8:
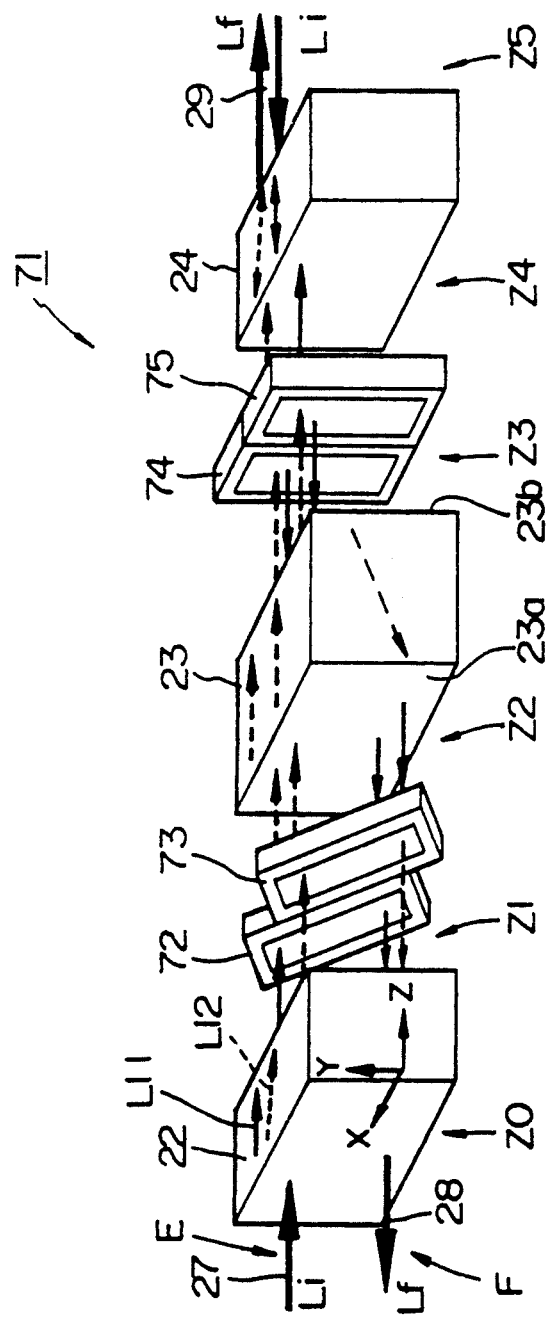
FIG. 8 is a perspective view showing an embodiment of the optical circulator according to the second embodiment of the present invention.

Next, an explanation is given of an optical circulator according to the second embodiment of the present invention, with reference to FIG. 8.

This optical circulator 71 does not use a reciprocal rotator. The rotator 25 of the first group in the above optical circulator 21 is replaced with non-reciprocal Faraday 45 rotators (non-reciprocal rotator: hereinafter simply referred to as the Faraday rotators) 72 and 73, and the rotator 26 of the second group is replaced with Faraday rotators 74 and 75.

The Faraday rotators 72 and 73 are arranged in one plane so that they will rotate in different directions, and the Faraday rotators 74 and 75 are also arranged in one plane so that they will rotate in different directions, just as in Faraday rotators 72 and 73. A second double refraction crystal plate 23 is arranged so that electric field vibrations coincident with the Faraday rotators 72 and 73 and (74 and 75) will become ordinary light.

Figure 9:
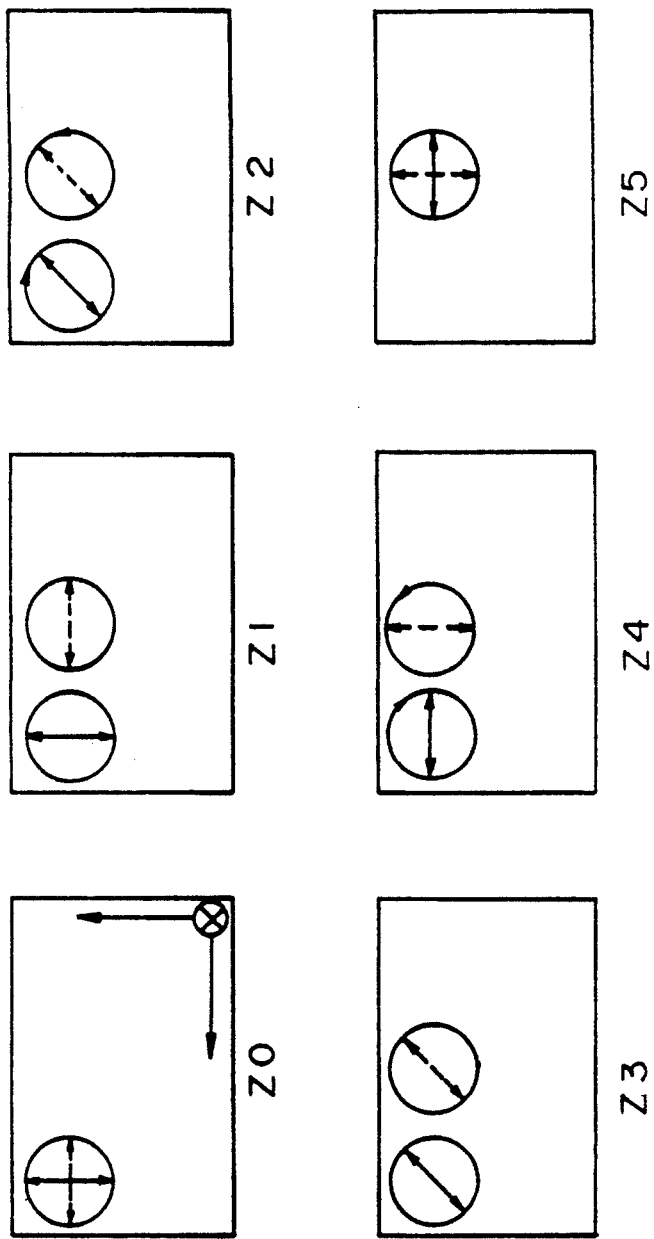
FIG. 9 is a drawing showing polarized light in a light path E according to the second embodiment of the present invention.

Next, operations of the optical circulator 71 are explained. FIG. 9 is a view of polarized light in light path E going from the light incoming and outgoing port 27 to the light incoming and outgoing port 29 as viewed from the side of the incoming light (the side of the light incoming and outgoing port 27). The light Li injected from the light incoming and outgoing port 27 is separated into light L11, being ordinary light, and light L12, being extraordinary light, on the X-Z plane by the first double refraction crystal plate 22 (state Z1).

The vibration of lights L11 and L12 are perpendicular to each other and coincide at the edge face 23a of the second double refraction crystal plate 23 by an action of the Faraday rotators 72 (73) rotating clockwise (counterclockwise), its direction being tilted by 45° from the Y axis (state Z2). Here, the second double refraction crystal plate 23 is arranged so that the light, whose vibrations are tilted by 45°, will become ordinary light.

The vibration directions of light L11 (L12), which have passed through the second double refraction crystal plate 23, are rotated by 45° by the action of the Faraday rotator 74 (75) rotating clockwise (counterclockwise), and these lights L11 and L12 are again perpendicular to each other. The two lights L11 and L12 are combined into one light Lf by the third double refraction crystal plate 24, and pass out from the light incoming and outgoing port 29.

Figure 10:
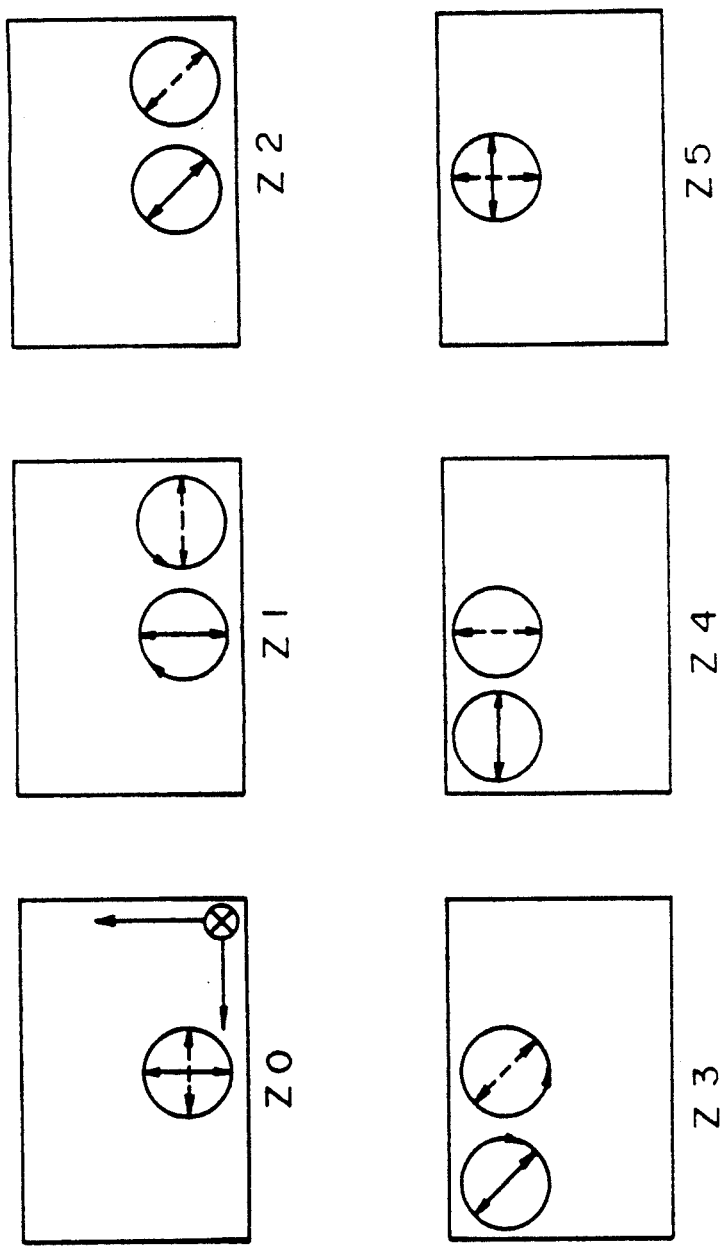
FIG. 10 is a drawing showing polarized light in a light path F according to the second embodiment of the present invention.

Next FIG. 10 is a view of polarized light in light path F going from the light incoming and outgoing port 29 to the light incoming and outgoing port 28 as viewed from the side of the outgoing light (the side of the light incoming and outgoing port 28).

The light Li injected from the light incoming and outgoing port 29 is separated into light L11, being extraordinary light, and light L12 being ordinary light, on the X-Z plane by the third double refraction crystal plate 24 (state Z4).

The vibration directions of the lights L11 and L12 are perpendicular to each other and will coincide at the edge face 23b of the second double refraction crystal plate 23 by action of the Faraday rotators 74 (75) rotating clockwise (counterclockwise), their directions being tilted by 45° from the Y axis (state Z3). This, being 90° different from the direction in light path E, becomes extraordinary light relative to the second double refraction crystal plate 23. Because these extraordinary lights by nature propagate 45° diagonally downward in the second double refraction crystal plate 23, the lights L11 and L12 will change from state Z3 to the state Z2.

The vibration directions of the two lights L11 and L12, which have passed through the second double refraction crystal plate 23, are again made perpendicular by the action of the Faraday rotators 72 (73) rotating clockwise (counterclockwise) (state Z1. The two lights L11 and L12 are perpendicular to each other and are combined by the action from the first refracted crystal plate 22 to become the light Lf, then are injected out from the light incoming and outgoing port 28.

Figure 11:
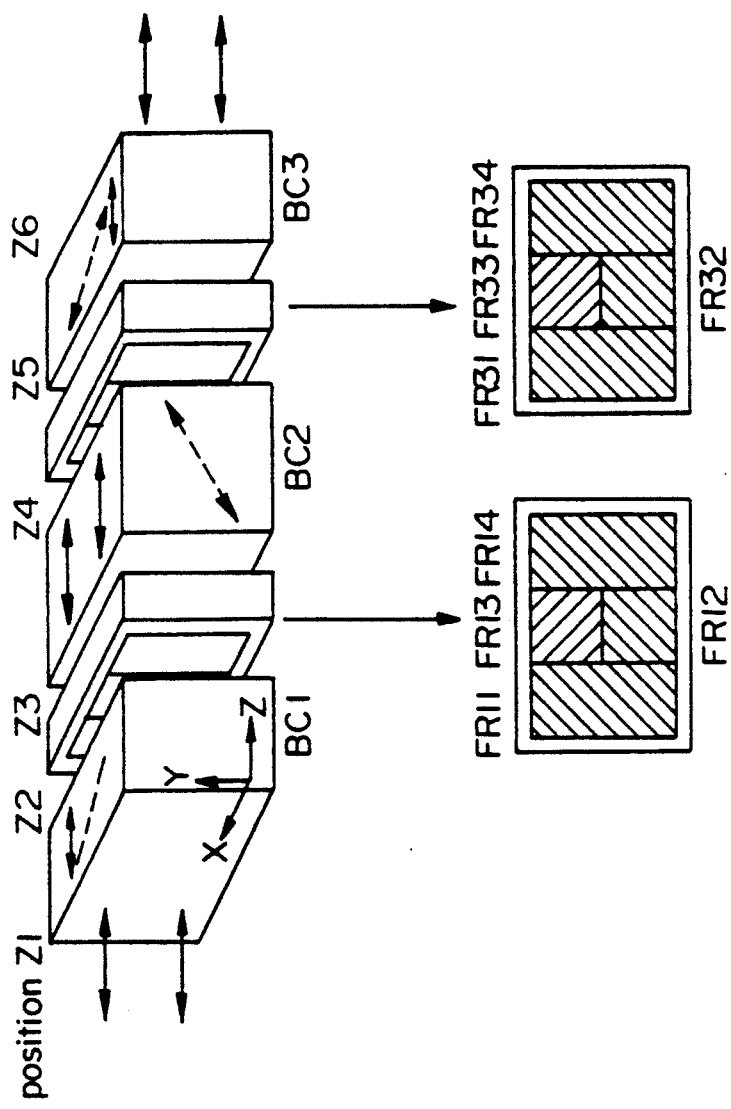
FIG. 11 is a perspective view showing a variant of the optical circulator of the second embodiment of the present invention.

Furthermore, FIG. 11 shows a variant of the optical circulator 71 of the second embodiment. The difference from the second embodiment is the configuration of Faraday rotators. Unlike the configuration in the optical circulator shown in FIG. 8 that reverses the rotating directions of the polarized face by means of reversing the magnetic field directions, this configuration uses Faraday elements that have different directions to rotate the polarized faces under particular magnetic field directions. Such Faraday rotators may include, for example, $(YbTbBi)_3Fe_5O_{12}$ and $(GdBi)_3(FeAlGa)_5O_{12}$, or Y.I.G. and $Y_{3-x}Bi_xFe_5O_{12}$, in the same way as the first embodiment.

As explained above, according to this optical circulator 71, a non-reciprocal circuit can be realized such that light Li injected from the light incoming and outgoing port 27 will pass out through the light incoming and outgoing port 29, and the light Li injected from the light incoming and outgoing port 29 will not pass through the light incoming and outgoing port 27, but through the light incoming and outgoing port 28.

The Third Embodiment

Next, an optical circulator according to the third embodiment of the present invention is explained with reference to FIG. 12.

This optical circulator 81 is constructed of the first through fourth double refraction crystal plates 82 through 85 disposed along the direction of light with a predetermined interval; a rotator 91 of the first group inserted between the first double refraction crystal plate 82 and the second refracted crystal plate 83; a rotator 92 of the second group inserted between the second double refraction crystal plate 83; and the third refracted crystal plate 84; a rotator 93 of the third group inserted between the third double refraction crystal plate 84 and the fourth double refraction crystal plate 85; light incoming and outgoing ports 94 and 95 disposed on the first double refraction crystal plate 82; and light incoming and outgoing ports 96 and 97 disposed on the fourth double refraction crystal plate 85.

According to the figure, the configuration and operations will be explained using an oblique coordinate system wherein the forward direction of the Z axis is the direction that goes from the side of the light incoming and outgoing ports 94 and 95 to the side of the light incoming and outgoing ports 96 and 97, this being from left to right in FIG. 12. The direction from bottom to top is the positive direction of the Y axis. The direction from the vertically upper section of the page to the vertically lower section is the forward direction of the X axis.

Figure 13:
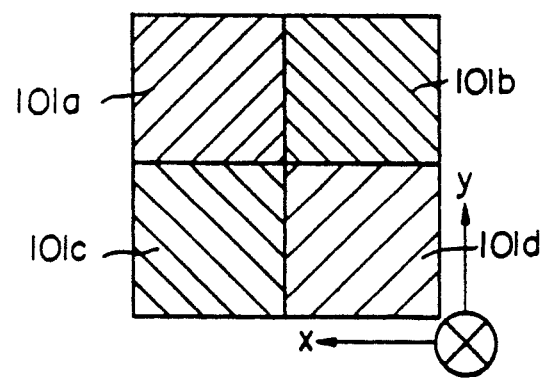
FIG. 13 is a plan view showing the configuration of a reciprocal rotator of the first group of optical circulators according to the third embodiment of the present invention.

The rotator 91 of the first group is composed of reciprocal and non-reciprocal rotators, that rotate the electric field vibration direction of the light to the same angle. Reciprocal rotators 101a and 101d rotate light clockwise by 45° (hereinafter simply referred to as the first reciprocal clockwise rotators); reciprocal rotators 101b and 101c rotate light counterclockwise by 45° (first reciprocal counterclockwise rotators); and non-reciprocal rotator 102 rotates light clockwise by 45° (first non-reciprocal clockwise rotator) (See FIG. 13).

Figure 12:
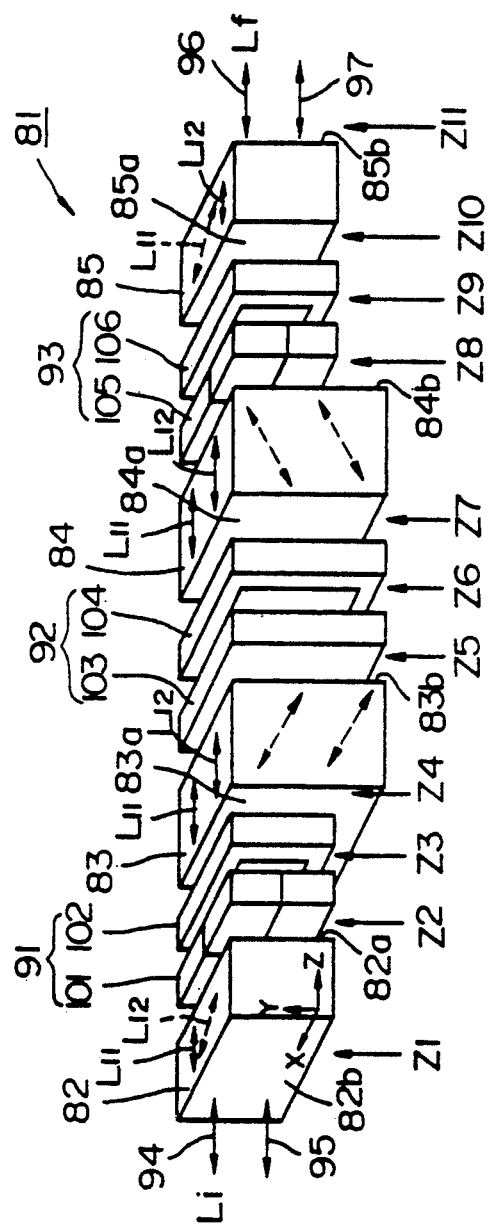
FIG. 12 is a perspective view showing a sample configuration of an optical circulator according to the third embodiment of the present invention.

Here, the clockwise direction is the direction to which the right side screw rotates when the screw moves toward the same direction as the light, i.e. when the light moves toward the forward direction of the Z axis (the direction from the left to the right in FIG. 12). In the case of the above light, the electric field spectrum rotates toward the direction the right side screw rotates. The positive direction means the direction of clockwise rotation from the perspective of someone facing the forward direction of the Z axis.

The rotator 92 of the second group has the same function as the rotator 91 of the first group, and consists of a second reciprocal rotator 103 that rotates light counterclockwise by 45° (the second reciprocal counterclockwise rotator), a second non-reciprocal rotator 104 that rotates light clockwise by 45° (second non-reciprocal clockwise rotator).

Figure 14:
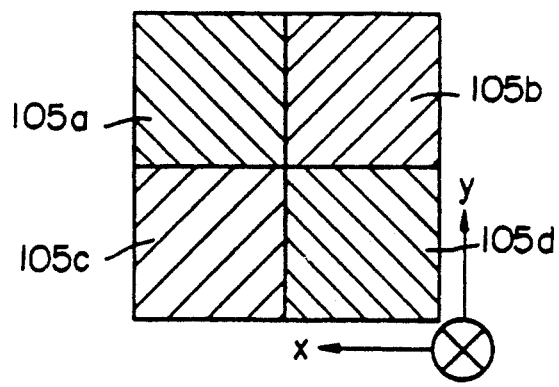
FIG. 14 is a plan view showing a configuration of a reciprocal rotator of the third group of optical circulators according to the third embodiment of the present invention.

The rotator 93 of the third group is structured similarly of the rotator 91 of the first group, and consists of third reciprocal rotators 105a and 105b that rotate light counterclockwise by 45° (third reciprocal counterclockwise rotators), third reciprocal rotators 105b and 105c that rotate light clockwise by 45° (third reciprocal clockwise rotators) and third non-reciprocal rotator 106 that rotates light clockwise by 45° (third non-reciprocal clockwise rotator) (See FIG. 14.)

For the double refraction crystal plates 82 through 85, calcite or futile crystals may be used to good effect. Quartz light rotators or ½ wave length plates or liquid quartz may be used for the reciprocal rotator, and a Faraday rotator using Y.I.G. crystal or Bi-added thick film crystals for non-reciprocal rotators. The composition of the Bi-added thick film crystals include, for example, $(YbTbBi)_3Fe_5O_{12}$ and $(GdBi)_3(FeAlGa)_5O_{12}$, or Y.I.G. and $Y_{3-x}Bi_xFe_5O_{12}$ in the same way as the first embodiment.

The double refraction crystal plates 82, . . . of this optical circulator 81 are arranged to meet the following requirements: when the light propagates toward the positive direction of the Z axis, the first double refraction crystal plate 82 and the fourth double refraction crystal plate 85 are so arranged that an extraordinary light will move toward the negative direction of the X axis on the X-Z plane. The second double refraction crystal plate 83 is so arranged that extraordinary light will move toward the negative direction of the Y axis on the Y-Z plane. The third double refraction crystal plate 84 is so arranged that extraordinary light will move toward the positive direction of the Y axis on the Y-Z plane.

The rotator 91 of the first group is set so that the direction of rotation of each rotator meets the following requirements: in the combination of the first reciprocal clockwise rotator (101a), the first reciprocal counterclockwise rotator 101b, and the first non-reciprocal clockwise rotator (102), the direction of rotation of each of the first reciprocal clockwise rotator 101a, the first reciprocal counterclockwise rotator 101b, and the first non-reciprocal clockwise rotator 102 is set such that the electric field vibration direction of ordinary light and extraordinary light separated by the first double refraction crystal plate 102 are parallel to the X axis at the edge face 83a of the second double refraction crystal plate 83.

In the combination of the first reciprocal clockwise rotator 101d, the first reciprocal counterclockwise rotator 101c, and the first non-reciprocal clockwise rotator 102, the direction of rotation of each of the rotators is set such that the electric field vibration directions 102 are parallel to the Y axis at the edge face 83a of the second double refraction crystal plate 83.

The rotator 93 of the second group has direction of rotation of each of the rotators set such that the electric field vibration directions of the two lights coinciding with each other at the edge face 83b of the second double refraction crystal plate 83 will not change as the light propagates in the positive direction of the Z axis.

Similarly, directions of the rotation of each of the third reciprocal clockwise rotators 105b and 105c, the third reciprocal counterclockwise rotators 105a and 105d, and the third non-reciprocal clockwise rotator 106 are set such that the electric field vibration directions of the two lights coinciding with each other at the edge face 84b of the third double refracted plate 84 will be perpendicular to each other at the edge face 85a of the fourth double refracted plate 85.

Next, the operation of the optical circulator 81 is explained.

Explanation is first given on how the light transmits at light path A going from the light incoming and outgoing port 94 to the light incoming and outgoing port 96 (light transmitted in the positive direction of the Z axis).

Figure 15:
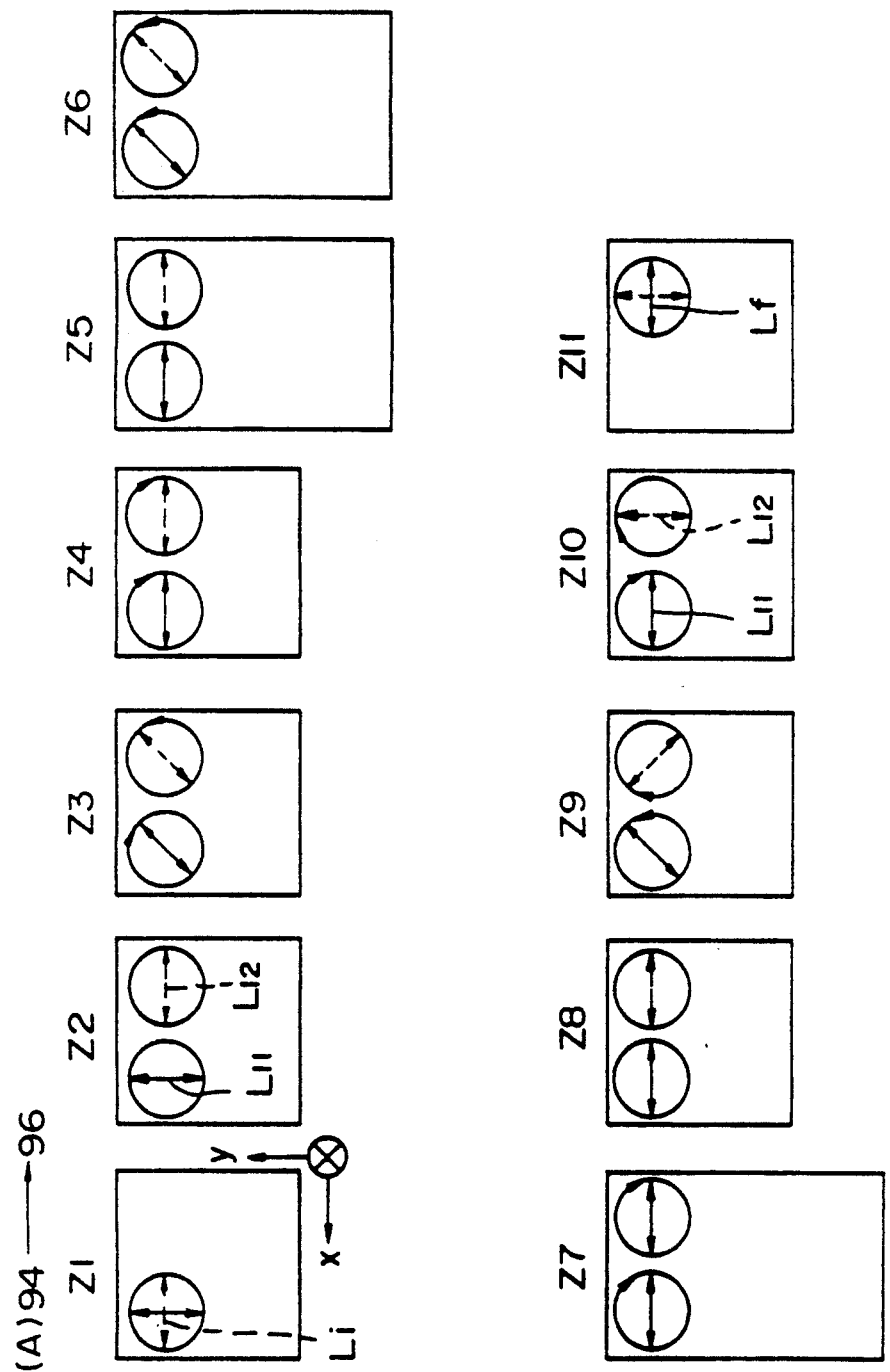
FIG. 15 is a drawing showing polarized light and spatial positions in light path A according to the third embodiment of the present invention.

FIG. 15 is a view of polarization states and spatial positions of light in light path A as viewed from the side of the incoming light (the side of the light incoming and outgoing port 94). These states are indicated below as Z1 through Z11.

The light Li injected from the light incoming and outgoing port 94 is in the Z1 state, and is separated into light L11 and light L12 on the X-Z plane by the first double refraction crystal plate 82. The light L11 is ordinary light (O-ray) relative to the first double refraction crystal plate 82, and the light L12 is extraordinary light (E-ray). The electric fields of these two lights are perpendicular to each other and vibrate in the Y and X directions as shown by Z2.

The electric fields of light L11 and light L12, which are perpendicular to each other, proceed in the same direction because light L11 passes through the first reciprocal clockwise rotator 101a, and light L12 passes through the first reciprocal counterclockwise rotator 101b. The polarization state at this time is as indicated by Z3.

Next, as a result of the first non-reciprocal clockwise rotator 102 rotating the light L11 and light L12 further clockwise by 45°, the vibration directions of the lights L11 and L12 become parallel to the X axis. (The polarization is of state Z4.) The result is that light L11 is rotated by 90° and light L12 is not rotated.

The lights L11 and L12, with their vibration directions parallel to the X axis, transmit as ordinary light through the second double refraction crystal plate 83.

In this case, the spatial position of the lights does not change, and the polarization is that of state Z5.

The two lights L11 and L12, which have passed through the second double refraction crystal plate 83, will pass through the rotator 92 of the second group. Because the rotator 82 of the second group has been set so as to apply no action to the polarization of the lights transmitting toward the positive direction of the Z axis, the polarization of the two lights L11 and L12 does not change (state Z7).

The two lights L11 and L12 transmit as ordinary light also through the third double refraction crystal plate 84. In this case too, the polarization of the two lights L11 and L12 does not change (state Z8).

After passing the third double refraction crystal plate 84, the two lights L11 and L12 pass the rotator 93 of the third group. In this case, the light L11 will have its electric field vibration direction offset by virtue of having passed through the third reciprocal counterclockwise rotator 105a and the third non-reciprocal clockwise rotator 106, and as a result, its vibration direction will not rotate. The light L12 will have its vibration direction rotated clockwise by 45° when it passes through the third reciprocal clockwise rotator 105b and the third non-reciprocal clockwise rotator 106, and as a result, its vibration direction will be rotated by 90° (state Z10). Therefore, the vibration directions of the two lights L11 and L12 are perpendicular at the edge face 25a of the fourth double refraction crystal plate 85.

The two lights L11 and L12, with L11 becoming extraordinary light and L12 becoming ordinary light relative to the fourth double refraction crystal plate 85, spatially coincide at the edge face 85b of the fourth double refraction crystal plate 85, are combined (light Lf), and pass through the light incoming and outgoing port 96 and propagate in the positive direction of the Z axis.

Figure 16:
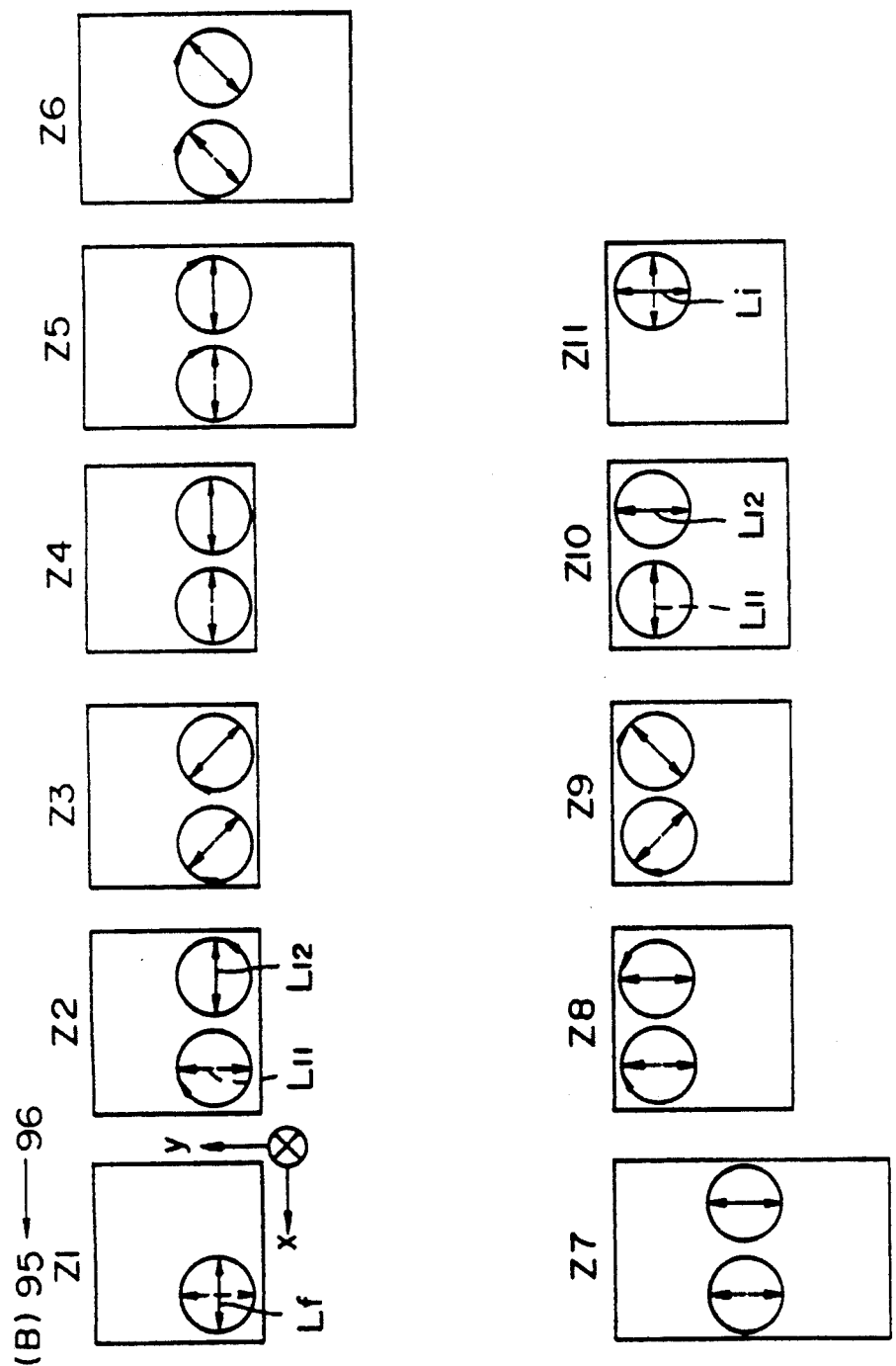
FIG. 16 is a drawing showing polarized light and spatial positions in light path B according to the third embodiment of the present invention.

Next, an explanation is given on how the light transmits at light path B going from the light incoming and outgoing port 96 to the light incoming and outgoing port 95 (light being transmitted in the negative direction of the Z axis). FIG. 16 is a view of the polarization states and spatial positions of light at the light path B as viewed from the side of the outgoing light (the side of the light incoming and outgoing port 95).

The light Li injected from the light incoming and outgoing port 96 is in the Z11 state, and is separated into light L11 and light L12 on the X-Z plane by the fourth double refraction crystal plate 85. Light L11 is extraordinary light and light L12 is ordinary light relative to the fourth double refraction crystal plate 85.

The two separated lights L11 and L12 will pass the rotator 93 of the third group. In this case, the lights will have a different rotation condition from that in light path A because of the non-reciprocity of the third non-reciprocal clockwise rotator 106.

Light L11 will have its electric field vibration direction rotated clockwise by 45° when it passes through its non-reciprocal clockwise rotator 106 and the third reciprocal counterclockwise rotator 105a, and as a result, the third vibration direction will be rotated by 90°. However, light L12 will have its vibration direction offset when it passes through the third non-reciprocal clockwise rotator 106 and the third reciprocal clockwise rotator 105b, and as a result, its vibration direction will not be rotated. Therefore, the electric field vibration directions of the two lights L11 and L12 are parallel to the Y axis at the edge face 84b of the third double refraction crystal plate 84, unlike the case in light path A (state Z8).

Being extraordinary light relative to the third double refracted crystal plate 84 in this direction, the lights L11 and L12 move in the negative direction along the Y axis as they transmit through the third double refraction crystal plate 84 (state Z7).

The two lights L11 and L12, having moved in the negative direction of the Y axis, receive action reverse to the light path A as they pass through the rotator 92 of the second group. That is, the polarization of the two lights L11 and L12 have not changed at light path A even if they pass through the rotator 92 of the second group, but at light path B, the electric vibrations of each of the two lights L11 and L12 rotate by 90°, and become parallel to the X axis (state Z5).

The two lights L11 and L12, with their vibration directions now parallel to the X axis, pass through the rotator 91 of the first group after having passed the second double refraction crystal plate 83. In this case, light L11 will have its electric field vibration directions rotated clockwise by 45° when it passes through the first non-reciprocal clockwise rotator 102 and the first reciprocal counterclockwise rotator 101c, and as a result, its electric field vibration direction will be rotated by 90°. However, light L12 will have its electric field vibration direction offset when passing through the first non-reciprocal clockwise rotator 102 and the first reciprocal clockwise rotator 101d, and as a result, its vibration direction will not be rotated. Therefore, the electric field vibration directions of each of the two lights L11 and L12 are perpendicular to each other at the edge face 82a of the first double refraction crystal plate 82, and become the same as in light path A (state Z2).

The two lights, L11 and L12, with L11 becoming extraordinary light and L12 becoming ordinary light relative to the first double refraction crystal plate 82, spatially coincide at the edge face 82b of the first double refraction crystal plate 82, are combined (light Lf), and pass through the light incoming and outgoing port 95 and propagate in the negative direction of the Z axis.

Figure 17:
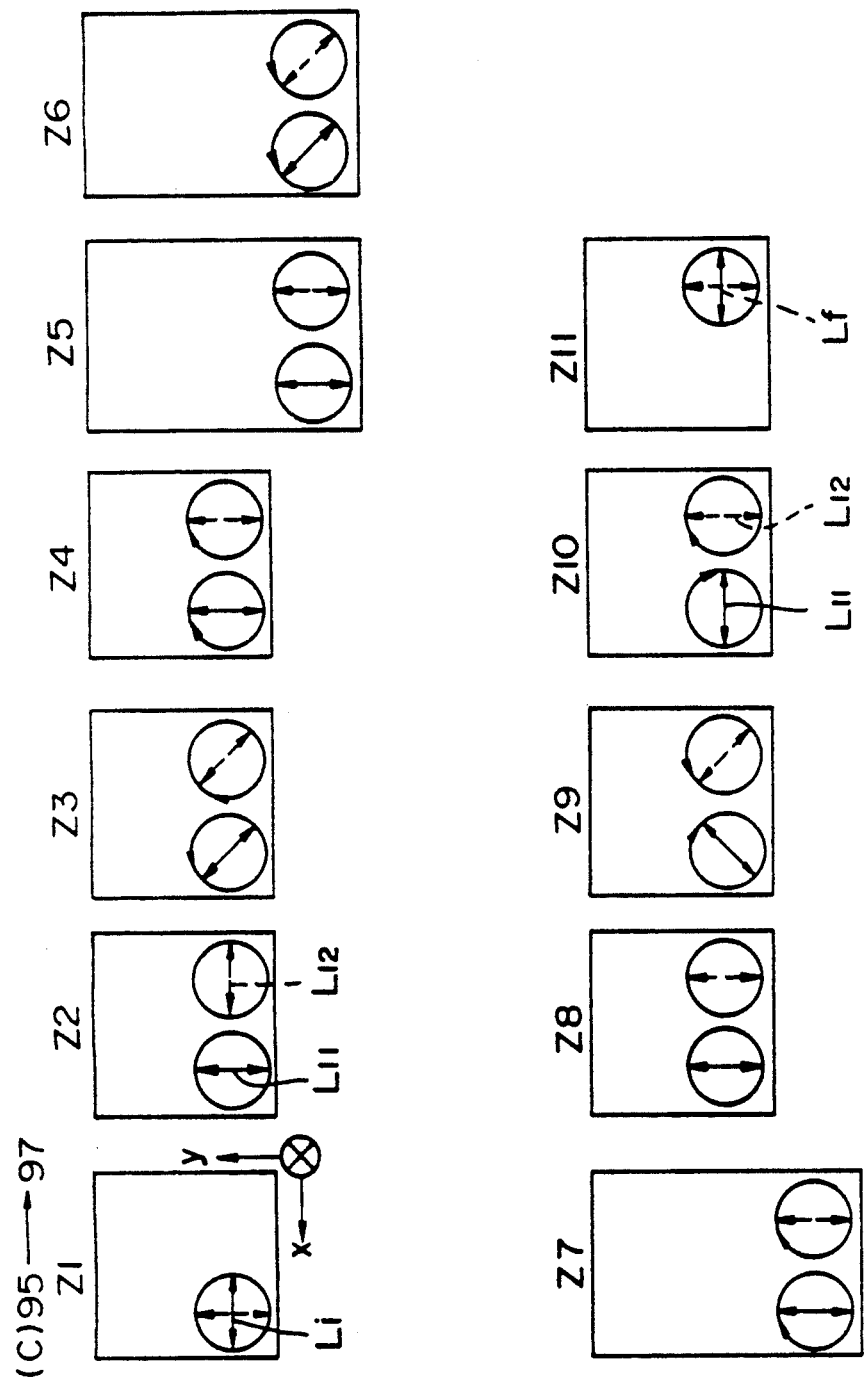
FIG. 17 is a drawing showing polarized light and spatial positions in light path C according to the third embodiment of the present invention.

Next, an explanation is given on how the light transmits at light path C going from the light incoming and outgoing port 95 to the light incoming and outgoing port 97 (light being transmitted in the positive direction of the Z axis). FIG. 17 is a view of the polarization states and spatial positions of light in light path C as viewed from the side of the incoming light (the side of the light incoming and outgoing port 95).

The light Li injected from the light incoming and outgoing port 95 is in state Z1, and is separated into light L11 and light L12 on the X-Z plane by the first double refraction crystal plate 82. Light L11 is ordinary light (O-ray) and light L12 is extraordinary light (E-ray) relative to the first double refraction crystal plate 82.

The two lights L11 and L12, having been separated by the first double refraction crystal plate 82, pass through the rotator 91 of the first group. In this case, the lights' rotations will be reverse to those in light path B, because of the non-reciprocity of the first non-reciprocal clockwise rotator 102. Therefore, the vibration directions of the two lights L11 and L12 are parallel to the Y axis at the edge face 83a of the second double refraction crystal plate 83 (state Z4).

Being extraordinary light relative to the second double refracted crystal plate 83 in this direction, the lights L11 and L12 will proceed in the negative direction along the Y axis as they transmit through the second double refraction crystal plate 83 (state Z5).

The two lights L11 and L12, having moved in the negative direction of the Y axis, receive action reverse to light path B as they pass through the rotator 92 of the second group. That is, the electric field vibration directions of each of the two lights L11 and L12 is parallel to the X axis as a result of 90° rotation in light path B, but in light path C, the polarization of the two lights L11 and L12 will not change even if passing through the rotator 92 of the second group (state Z7). Therefore, the electric field vibration directions are parallel to the Y axis at the edge face 84a of the third double refraction crystal plate 84.

Being extraordinary light relative to the third double refraction crystal plate 84 in this direction, the lights L11 and L12 will move in the positive direction along the Y axis as they are transmitted through the third double refraction crystal plate 84 (state Z8).

The two lights L11 and L12, with their vibration directions now in parallel with the Y axis, pass through the rotator 93 of the third group. In this case, light L11 will have its electric field vibration direction rotated clockwise by 45° when passing through the third reciprocal clockwise rotator 105c and the third non-reciprocal clockwise rotator 106, and as a result, its electric field vibration direction will be rotated by 90°. However, light L12 will have its electric field vibration direction offset when passing through the third reciprocal counterclockwise rotator 105d and the third non-reciprocal clockwise rotator 106, and as a result, its vibration direction will not be rotated. Therefore, the vibration directions of the two lights L11 and L12 are perpendicular to each other at the edge face 85a of the fourth double refraction crystal plate 85 and have the same state as in light path A (state Z10).

The two lights L11 and L12, with L11 becoming extraordinary light and L12 becoming ordinary light relative to the fourth double refraction crystal plate 85, spatially coincide at the edge face 85b of the fourth double refraction crystal plate 85, are combined (light Lf), and pass through the light incoming and outgoing port 97 and propagate in the positive direction of the Z axis.

Next an explanation is given on how light is transmitted in light path D from the light incoming and outgoing port 97 to the light incoming and outgoing port 94 (light being transmitted in the negative direction of the Z axis).

Figure 18:
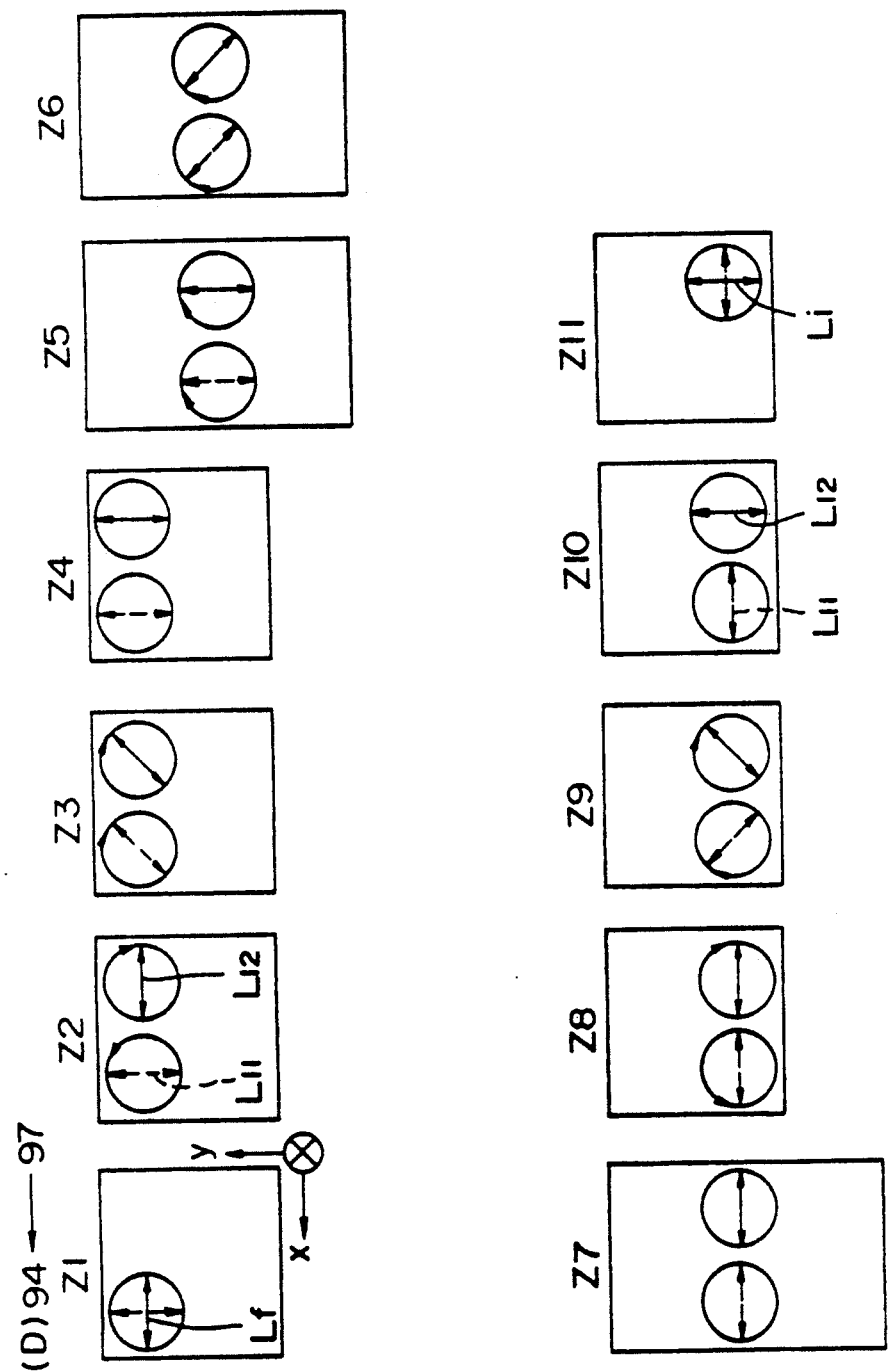
FIG. 18 is a drawing showing polarized light and spatial positions in light path D according to the third embodiment of the present invention.

FIG. 18 is a view of polarization states and spatial positions of light in light path D as viewed from the side of the outgoing light (the side of the light incoming and outgoing port 94).

Much as in light path B, light Li injected from the light incoming and outgoing port 97 is separated into light L11, being extraordinary light, and the light L12, being ordinary light, on the X-Z plane by the fourth double refraction crystal plate 85, and passes through the rotator 93 of the third group.

Light L11 will have its electric field vibration direction offset when it passes through the third non-reciprocal clockwise rotator 106 and the third reciprocal clockwise rotator 105c, and as a result, its vibration direction will not be rotated. However, light L12 will have its electric field vibration direction rotated clockwise by 45° when it passes through the third non-reciprocal clockwise rotator 106 and the third reciprocal counterclockwise rotator 105d, and as a result, its electric field vibration direction will be rotated by 90°. Therefore, the vibration directions of the two lights L11 and L12 are parallel to the X axis at the edge face 84b of the third double refraction crystal plate 84, unlike the cases of light paths B and C. (state Z10).

Being ordinary light relative to the third double refraction crystal plate 84 in this direction, the lights L11 and L12 move straight through the third double refraction crystal plate 84 (state Z7).

The two lights L11 and L12, having moved straight, receive the same treatment as in light path B as they pass through rotator 92 of the second group. That is, the electric field vibration direction of each of the two lights L11 and L12 is rotated by 90°, and is parallel to the Y axis (state Z5).

Being extraordinary light relative to the second double refraction crystal plate 83 in this direction, the lights L11 and L12 are transmitted in the positive direction along the Y axis through the second double refraction crystal plate 83 and enter state Z4.

The two lights L11 and L12, having moved in the positive direction of the Y axis, pass through rotator 91 of the first group. In this case, the lights will receive treatment reverse to that in light path A. Light L11 will have its electric field vibration direction offset when it passes through the first non-reciprocal clockwise rotator 102 and the first reciprocal clockwise rotator 101a, and as a result, its vibration direction will not be rotated. However, light L12 will have its electric field vibration direction rotated clockwise by 45° when it passes through the first non-reciprocal clockwise rotator 102 and the first reciprocal counterclockwise rotator 101b, and as a result, its electric field vibration direction will be rotated by 90°. Therefore, the vibration directions of the two lights L11 and L12 are perpendicular to each other at the edge face 82a of the first double refraction crystal plate 82, and the polarization is the same as in light path B (state Z2).

The two lights L11 and L12, with L11 becoming ordinary light and L12 becoming extraordinary light relative to the first double refraction crystal plate 82, spatially coincide at the edge face 82b of the first double refraction crystal plate 82, are combined (light Lf), and are transmitted in the positive direction of the Z axis, passing through the light incoming and outgoing port 94.

As explained above, this optical circulator 81 is constructed of first through fourth double refraction crystal plates 82 through 85 disposed along the direction of a light propagation at some predetermined interval; a rotator 91 of the first group inserted between the first double refraction crystal plate 82 and the second refracted crystal plate 83; a rotator 92 of the second group inserted between the second double refraction crystal plate 83 and the third refracted crystal plate 84; a rotator 93 of the third group inserted between the third double refraction crystal plate 84 and the fourth refracted crystal plate 85; light incoming and outgoing ports 94 and 95 disposed on the first double refraction crystal plate 82; and light incoming and outgoing ports 96 and 97 disposed on the fourth double refraction crystal plate 85. Therefore, the optical circulator can be constructed by normal optical coupling technology, and yet the isolation can be kept high as in the conventional optical circulator 1, and optical coupling technology of a very high level is not required.

According to this optical circulator 81, the optical circulator can perform a circulating non-reciprocal operation such that the light Li injected from the light incoming and outgoing port 94 passes through the light incoming and outgoing port 96, and the light Li injected from the light incoming and outgoing port 96 does not pass through the light incoming and outgoing port 94 but from the light incoming and outgoing port 95. Light Li injected from the light incoming and outgoing port 95 passes through light incoming and outgoing port 97, and light Li injected from the light incoming and outgoing port 97 does not pass from the light incoming and outgoing port 95, but from the light incoming and outgoing port 94.

As explained above, the present invention can provide an optical circulator capable of effectively utilizing all light injected from multiple incoming and outgoing ports without wasting it, is capable of elevating isolation between the incoming and outgoing ports, and is easy to manufacture, the optical linking included.

The clockwise and counterclockwise rotations explained above may be realized either by reciprocal rotators or non-reciprocal rotators. In addition, in non-reciprocal Faraday rotation, it is possible to alter the rotation direction by means of changing the direction of the magnetic force.

Figure 19:
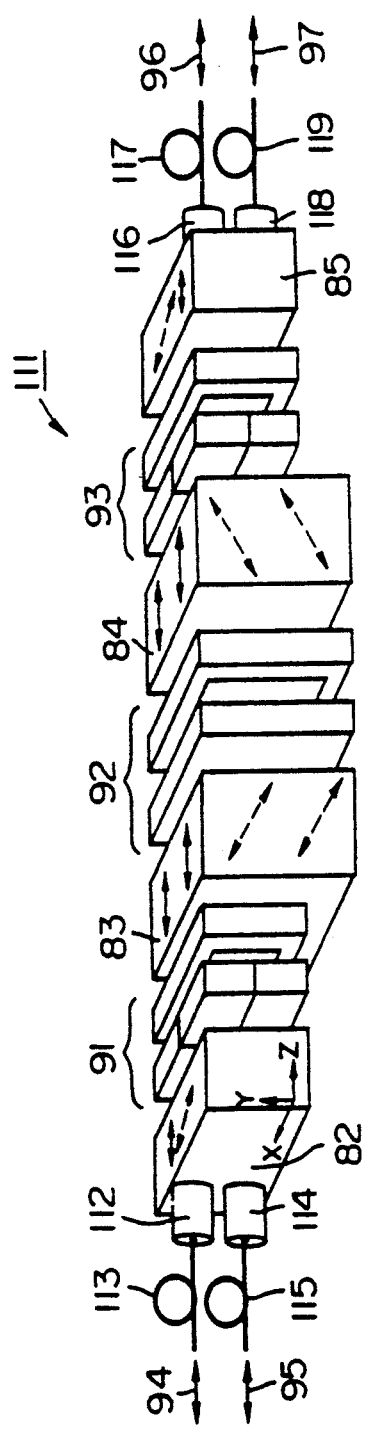
FIG. 19 is a perspective view showing variant on the optical circulator of the third embodiment of the present invention.

FIG. 19 shows variant on the above optical circulator 81.

The difference in this optical circulator 111 from the above optical circulator 81 is that a lens 112 and an optic fiber 113 are disposed coaxially between the first double refraction crystal plate 82 and the light incoming and outgoing port 94; a lens 114 and an optic fiber 115 are disposed coaxially between the first double refraction crystal plate 82 and the light incoming and outgoing port 95; and further, a lens 116 and an optic fiber 117 are disposed coaxially between the fourth double refraction crystal plate 85 and the light incoming and outgoing port 96; moreover, a lens 118 and an optic fiber 119 are disposed coaxially between the fourth double refraction crystal plate 85 and the light incoming and outgoing port 97.

This optical circulator 111 also provides the same operations and effects as the optical circulator 81. Circulating non-reciprocal operation can be realized such that the light Li injected from the light incoming and outgoing port 94 will go out from the light incoming and outgoing port 96, and the light Li injected from the light incoming and outgoing port 96 will not go out from the light incoming and outgoing port 94, but from the light incoming and outgoing port 95; light Li injected from the light incoming and outgoing port 95 will go out from the light incoming and outgoing port 97, and light Li injected from the light incoming and outgoing port 97 will not go out from the light incoming and outgoing port 95, but from the light incoming and outgoing port 94.

Thus, in the above-mentioned optical circulators 81 and 111, the number of light incoming and outgoing ports is not limited to those explained in the above embodiments, but may be changed as necessary.

Further, the optic fibers 113, ... are of course capable of being replaced with light wave guide paths that can capture light energy and transmit it. These optic fibers 113 ... may have either a single mode or a number of modes.

The Fourth Embodiment

Figure 20:
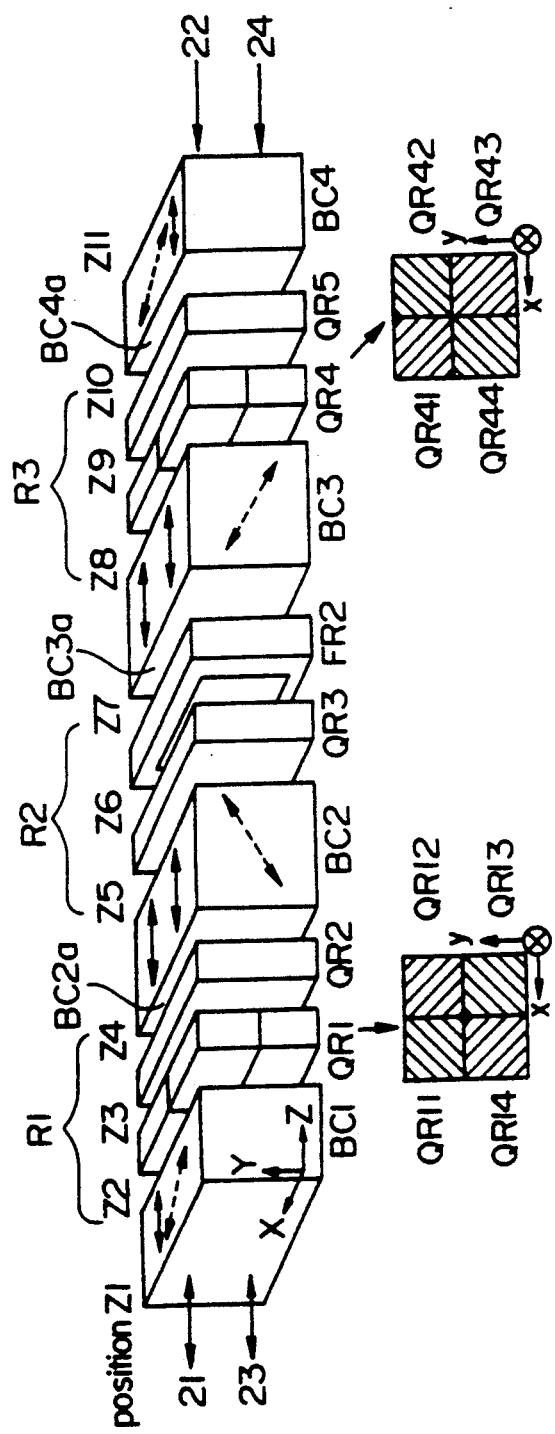
FIG. 20 is a perspective view showing the fourth embodiment of an optical circulator of the present invention.

A fourth embodiment of the present invention is shown in FIG. 20.

This optical circulator is summarily constructed of first through fourth double refraction crystal plates BC1 through BC4 disposed along the direction of light propagation at predetermined intervals; a rotator group R1 inserted between the first double refraction crystal plate BC1 and the second double refraction crystal plate BC2; a rotator group R2 inserted between the second double refraction crystal plate BC2 and the third refracted crystal plate BC3; a rotator group R3 inserted between the third double refraction crystal plate BC3 and the fourth refracted crystal plate BC4; light incoming and outgoing ports 21 and 23 disposed on the first double refraction crystal plate BC1; and light incoming and outgoing ports 22 and 24 disposed on the fourth double refraction crystal plate BC4. In this configuration, the double refraction crystal plates BC1 and BC4 are used to divide and combine two electric field vibrations where the lights are crossed perpendicularly, the rotators of the first and third groups are used as a means to make the two vibrations parallel and perpendicular, and the refracted crystal plates BC2 and BC3 and the rotators of the second group are used as a means to determine light paths depending on the electric field vibration directions of the lights.

In FIG. 20, operations are described using an oblique coordinate system wherein the direction from left to right on the page is the positive direction of the Z axis. From the perspective of someone observing the direction of rotation of polarization facing the positive direction of the Z axis, the clockwise direction is the positive direction.

The rotator group R1 comprises two reciprocal rotators disposed along the direction of light propagation. The first rotator QR1 is a composite rotator consisting of reciprocal rotators QR11 and QR13 that rotate light clockwise by 45° (hereinafter simply referred to as reciprocal clockwise rotators) and reciprocal rotators QR12 and QR14 that rotate light counterclockwise (reciprocal counterclockwise rotators) installed in a plane vertical to the direction of the light. The second rotator is a reciprocal clockwise rotator QR2. The rotation direction polarization by QR2 may be either clockwise or counterclockwise.

The rotator group R2 comprises a reciprocal counterclockwise rotator QR3, and a non-reciprocal rotator FR2 that rotates light clockwise (non-reciprocal clockwise rotator). In this case, the electric field vibration direction of light transmitted in the positive direction of the Z axis will not change even if passing through the two rotators, and light transmitted in the negative direction of the Z axis will rotate by 90°.

The rotator group R3 has the same configuration as rotator group R1, and consists of reciprocal counterclockwise rotators QR31 and QR33, reciprocal clockwise rotators QR32 and QR34, and a non-reciprocal clockwise rotator QR5.

Calcite or rutile crystals are used to good effect in the above double refraction crystal plate, and so are quartz light rotators or ¼ wave length plates or liquid quartz for the reciprocal rotator, and a Faraday rotator using Y.I.G. crystals or GBIG crystals for the non-reciprocal rotator.

In this optical circulator, the double refraction crystal plates BC1, ... are disposed under the following conditions: The first double refraction crystal plate BC1 and the fourth double refraction crystal plate BC4 are so arranged that extraordinary light will move in the negative direction of the X axis on the X-Z plane as the light moves in the positive direction of the Z axis. The second double refraction crystal plate BC2 is so arranged that extraordinary light will move in the negative direction of the Y axis on the X-Z plane. The third double refraction crystal plate BC3 is so arranged that extraordinary light will move in the positive direction of the Y axis on the Y-Z plane.

The directions of rotation of the reciprocal clockwise rotator QR11, the reciprocal counterclockwise rotator QR12, and the reciprocal clockwise rotator QR2 are set such that the electric field vibration directions of the ordinary light and extraordinary light divided by the first double refraction crystal plate BC1 are parallel to the X axis at the edge face BC2a of the second double refraction crystal plate BC2. The directions of rotation of the reciprocal clockwise rotator QR13, the reciprocal counterclockwise rotator QR14, and the reciprocal clockwise rotator QR2 are set such that the vibration directions are parallel to the Y axis.

Similarly, the directions of rotation of the reciprocal clockwise rotators QR42 and QR44, the reciprocal counterclockwise rotators QR41 and QR43, and the reciprocal clockwise rotator QR5 are set such that the electric field vibration directions of the two lights coinciding at the edge face BC3a of the third double refraction crystal plate BC3 are perpendicular to each other at the edge face BC4a of the fourth refraction crystal plate BC4.

Next, the operation of the optical circulator is explained.

Figure 21:
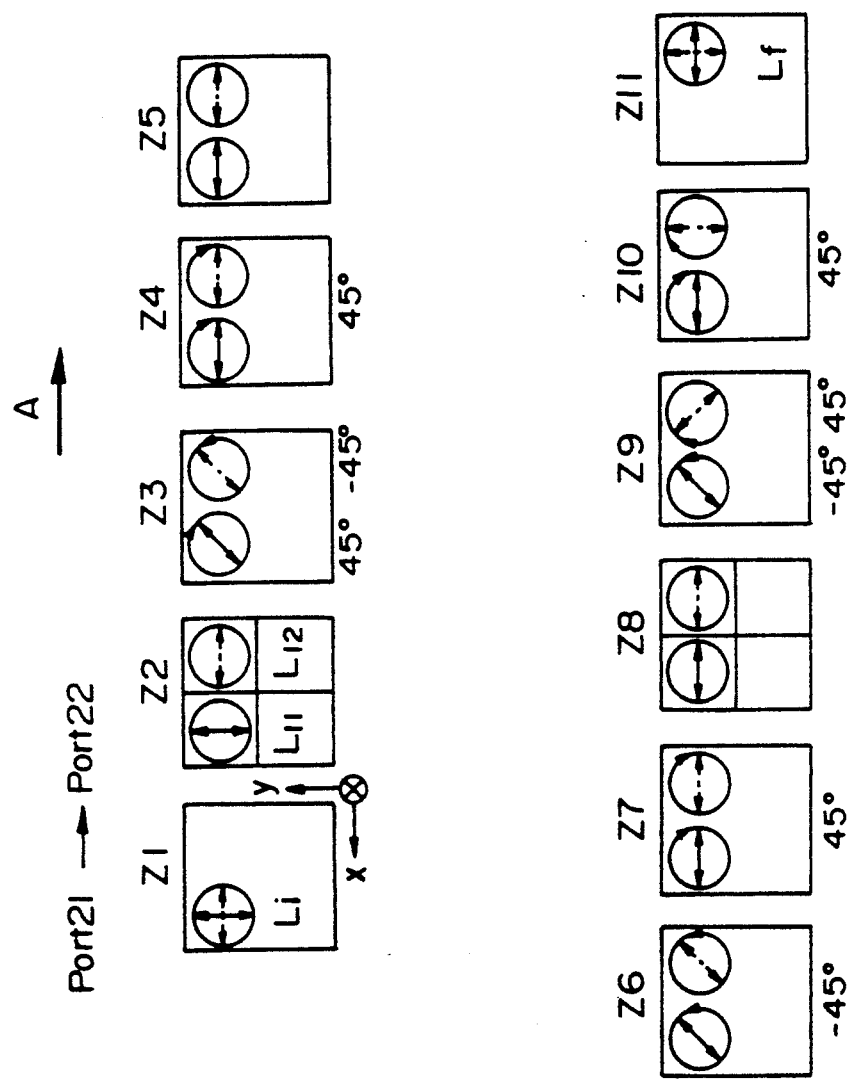
FIG. 21 is a drawing showing polarized light and spatial positions in light path A.

FIG. 21 is a view of polarized light in light path A going from the light incoming and outgoing port 21 to the light incoming and outgoing port 22 as viewed from the side of the incoming light. These states are indicated below as Z1 through Z11.

Light Li injected from the light incoming and outgoing port 21 is in state Z1, and is divided into light L11 and light L12 on the X-Z plane by BC1. Light L11 is ordinary light (O-ray), and light L12 is extraordinary light (E-ray). The electric fields of these lights are perpendicular, vibrating in the Y and X axis directions as shown by polarization state Z2.

The electric fields of light L11 and light L12, which are perpendicular with each other, are parallel to the X axis as a result of having passed through the rotator group R1. Because light L11 passes through the reciprocal clockwise rotator QR11, and light L12 passes through the reciprocal counterclockwise rotator QR12, the contents are parallel diagonally with each other as shown in polarization state Z3, and then become parallel to the X axis after passing through the reciprocal clockwise rotator QR2 (state Z4).

Lights L11 and L12, whose vibration directions are parallel with the X axis, are transmitted as ordinary light through BC2. In this case, polarization state Z5 is the same as Z4 because the spatial positions of the lights do not change. The two lights, having passed through BC2, now pass through rotator group R2. Polarization state Z7 is the same as Z5 because the rotator group R2 does not rotate the electric vibration direction against the lights transmitting toward the positive direction of the Z axis. Therefore, the two lights L11 and L12 are transmitted as ordinary light through BC3, and enter polarization state Z8.

The two lights, having passed through BC3, how pass through rotator group R3. As a result of passing through the rotator group R3, the parallel electric fields become perpendicular as shown in polarization state Z10. This is because the electric field of light L11 has its rotation offset as a result of having passed through the reciprocal counterclockwise rotator QR41 and the reciprocal clockwise rotator QR5, and light L12 has its vibration direction rotated clockwise by 45° as a result of having passed through the reciprocal clockwise rotator QR42 and the reciprocal clockwise rotator QR5 (state Z10).

The two lights L11 and L12, each becoming extraordinary light and an ordinary light relative to the fourth double refraction crystal plate BC4, spatially coincide at the edge face BC4b of the fourth double refraction crystal plate BC4, are combined (light Lf), and propagate in the positive direction of the Z axis.

Figure 22:
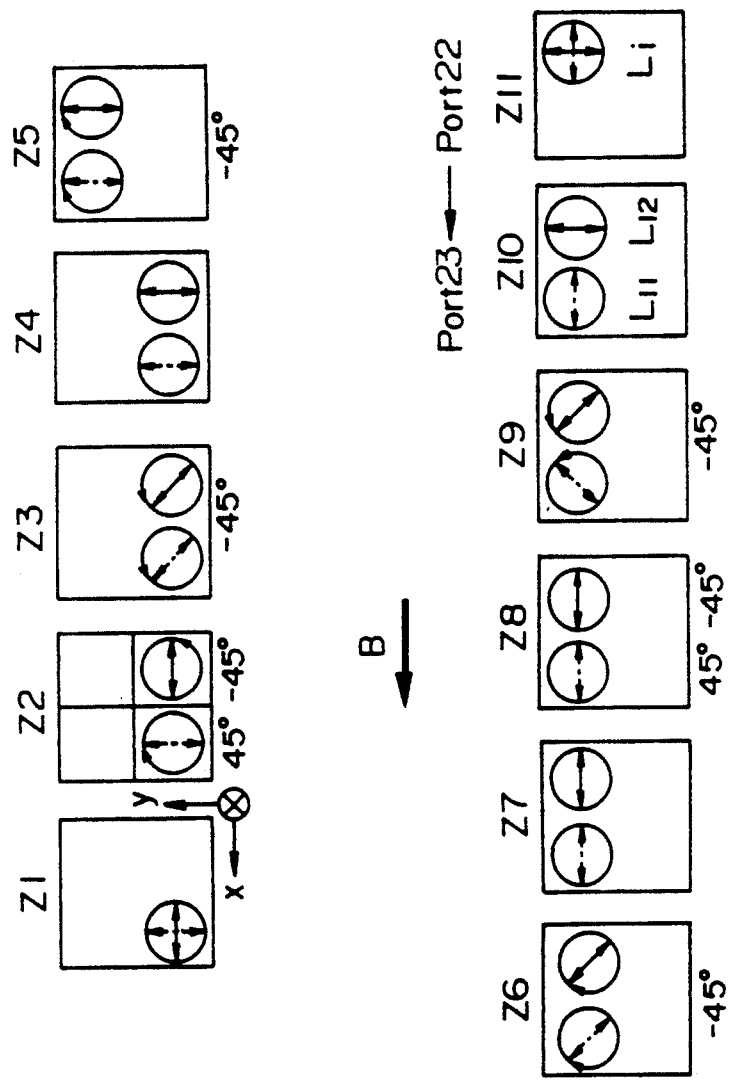
FIG. 22 is a drawing showing polarized light and spatial positions in light path B.

FIG. 22 is a view of polarized light in light path B (light transmitted in the negative direction of the Z axis) going from the light incoming and outgoing port 22 to the light incoming and outgoing port 23 as viewed from the side of the outgoing light (the side of light incoming and outgoing port 3). The polarized light Li injected from the light incoming and outgoing port 22 is the same as in light path A up to the polarization state Z7 at the outgoing edge face BC3a of the double refraction crystal plate BC3. This is because all of the double refraction crystal plates BC4 and BC3 and the rotator group R3 offer reciprocity.

The two lights L11 and L12, whose electric field vibration directions are parallel to the X axis (shown by polarization state Z7) are ordinary light passing through the rotator R2, with its vibration direction rotated by 90°, being in polarization state Z5. In polarization state Z5, the electric fields face the X axis direction, hence the lights are transmitted as extraordinary light through the double refraction crystal plate BC2 while moving in the negative direction of the Y axis (state Z4).

The two lights having electric fields in the Y axis direction cross perpendicularly as a result of passing through the rotator group R1. This is because light L11 vibrates in the Y axis direction as a result of having passed through the reciprocal clockwise rotator QR2 and the reciprocal counterclockwise rotator QR14, and light L12 vibrates in the X axis direction as a result of having passed through the reciprocal clockwise rotator QR2 and the reciprocal clockwise rotator QR13.

The two lights L11 and L12 in the polarization state Z2 are combined and sent out at port 3, which is deviated closer to the negative direction of the Y axis than port 1.

Figure 23:
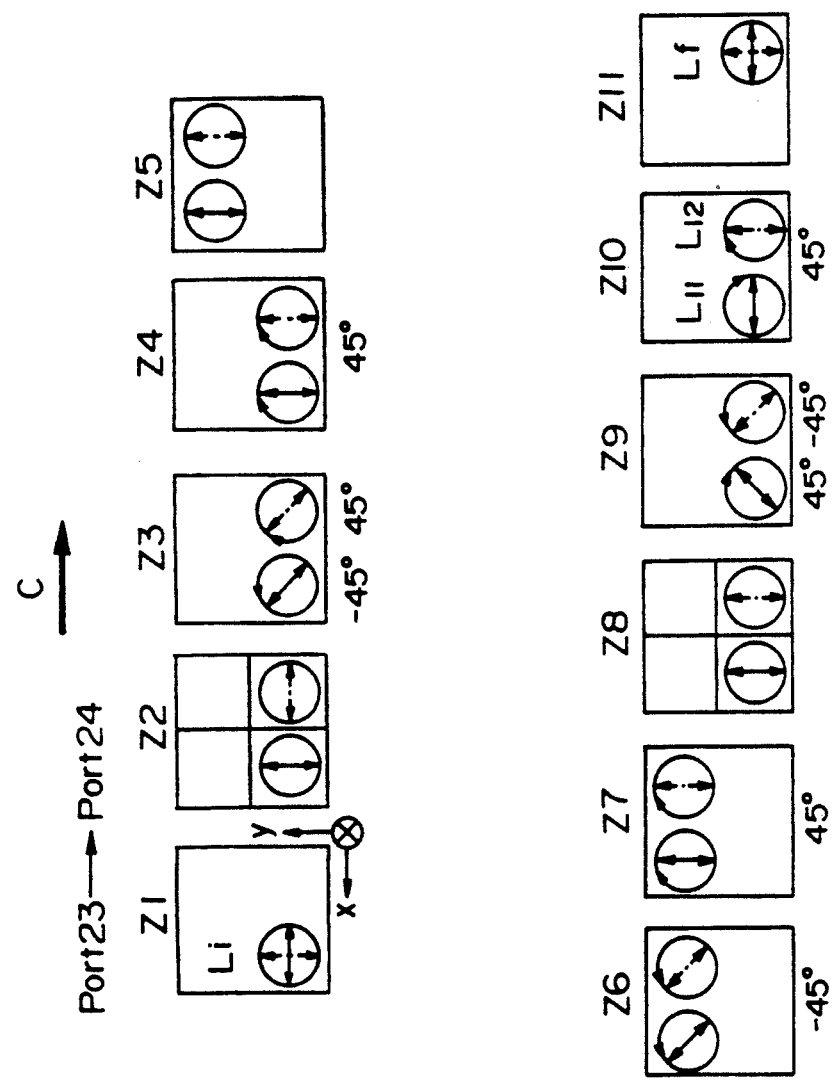
FIG. 23 is a drawing showing polarized light and spatial positions in light path C.

Next, FIG. 23 is a view of polarized light in light path C (light transmitted in the positive direction of the Z axis) going from the light incoming and outgoing port 23 to the light incoming and outgoing port 24 as viewed from the side of the incoming light (the side of the light incoming and outgoing port 24).

The polarization of light Li injected from the light incoming and outgoing port 23 is the same as in light path B up to polarization state Z5 at the outgoing edge face BC2b of the double refraction crystal plate BC2.

The two lights L11 and L12, whose electric field vibration directions face the Y axis, do not change their vibration directions even after passing through the rotator group R2, and are in polarization state Z7. In polarization state Z7, the electric field contents are parallel to the Y axis, hence the lights are transmitted as extraordinary light through the double refraction crystal plate BC3 while moving in the negative direction of the Y axis (state Z8).

The two lights, having two electric fields facing the Y axis direction, cross perpendicularly as a result of passing through the rotator group R3. This is because light L11 vibrates in the X axis direction as a result of passing through the reciprocal clockwise rotator QR43 and the reciprocal clockwise rotator QR5, and light L12 vibrates in the Y axis direction as a result of having passed through the reciprocal counterclockwise rotator QR43 and the reciprocal clockwise rotator QR5 (state Z10).

The two lights L11 and l12 in polarization state Z10 are combined are emitted from the port 24, which is deviated closer to the negative direction of the Y axis than the port 22 as a result of having passed through the double refraction crystal plate BC4.

Figure 24:
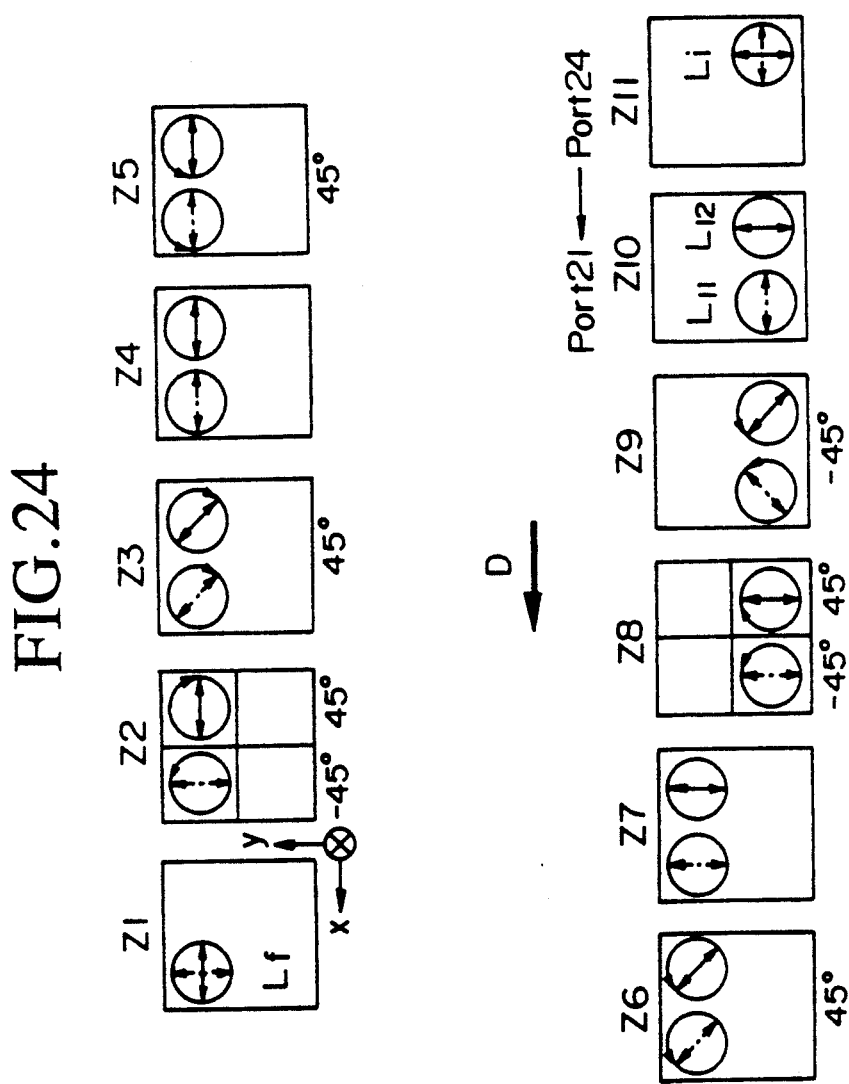
FIG. 24 is a drawing showing polarized light and spatial positions in light path D.

Next, FIG. 24 is a view of polarization states of the light in light path D (light transmitted in the negative direction of the Z axis) going from the light incoming and outgoing port 24 to the light incoming and outgoing port 21 as viewed from the side of the outgoing light (the side of the light incoming and outgoing port 21).

The polarization state of light Li injected from the light incoming and outgoing port 24 is the same as in light path C up to polarization state Z7 at the outgoing edge face BC3a of the double refraction crystal plate BC3. The two lights L11 and L12, whose electric field vibration directions are parallel to the Y axis, in polarization state Z7 have their vibration directions rotated by 90°, and are in polarization state Z5. In polarization state Z5, the electric fields, being parallel to the X axis, are transmitted as ordinary light through the double refraction crystal plate BC2 (state Z4).

The two lights, having the electric fields in the X axis direction are emitted to the port 1 while showing the same states Z1 through Z4 in light path A by the reciprocity of the rotator group R1 and the double refraction crystal plate BC1.

As explained above, according to the optical circulator of the present invention, it is possible to transmit light circularly in such a manner that light Li radiated from the light incoming and outgoing port 21 is emitted from the light incoming and outgoing port 22; light radiated from the light incoming and outgoing port 23 is emitted from the light incoming and outgoing port 24; and light radiated from the light incoming and outgoing port 24 is emitted from the light incoming and outgoing port 21. The above-mentioned relationship between clockwise and counterclockwise rotation may be reversed.

Figure 25:
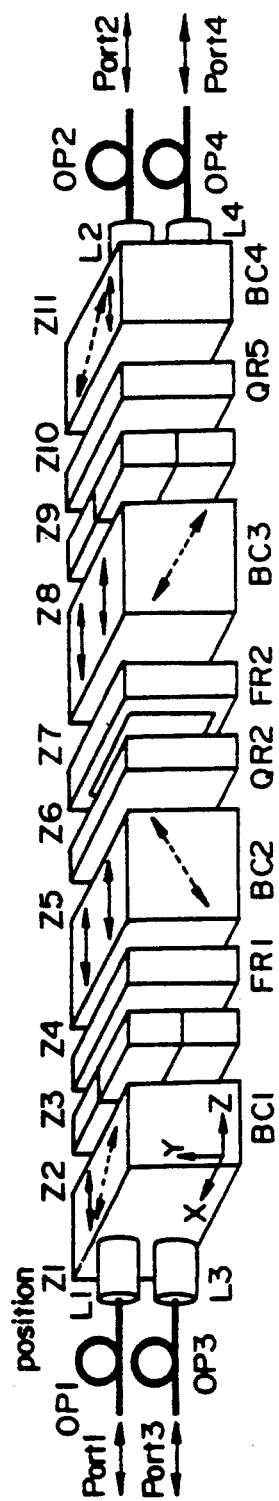
FIG. 25 is a perspective view showing a variant on the optical circulator of the fourth embodiment of the present invention.

FIG. 25 shows a variant on the above optical circulator. The difference between this optical circulator and the above optical circulator is that lenses L1 and L3 and optic fibers OP1 and OP3 are disposed coaxially between the first double refraction crystal plate BC1 and the light incoming and outgoing ports 1 and 3; the fourth double refraction crystal plate BC4, the light incoming and outgoing ports 2 and 4, and the optic fibers OP2 and OP4 are also disposed coaxially.

The Fifth Embodiment

Figure 26:
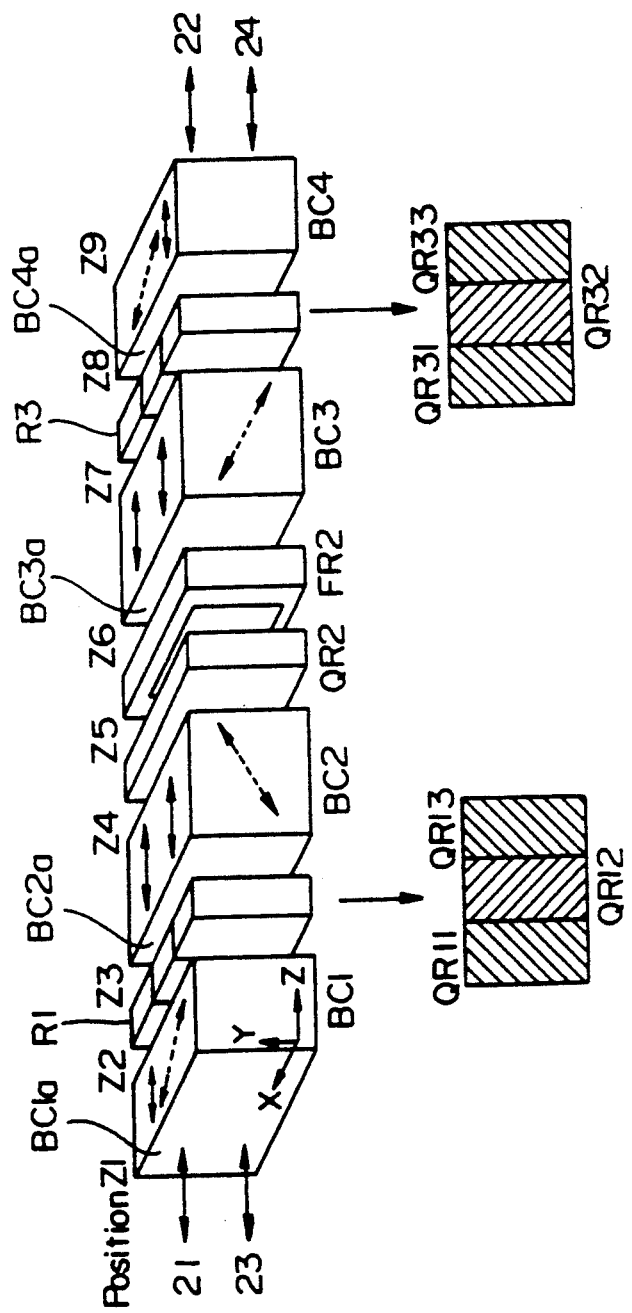
FIG. 26 is a perspective view showing the fifth embodiment of an optical circulator of the present invention.

A fifth embodiment of the present invention is shown in FIG. 26.

The difference between the optical circulator in the fifth embodiment from that in the fourth embodiment is that the polarization means to make the two electric field vibration contents parallel and perpendicular (rotators R1 and R2 of the first and second groups) are simplified, and the crystal axis direction in the case of double refraction crystal plates BC2 and BC4, is tilted by 45° from that in the fourth embodiment. In the explanation of the following operations, the lengths of the double refraction crystal plates BC2 and BC4 are increased by a factor of R(2) times over that in the fourth embodiment. Directionality in the coordinate system and rotations are identical with those in the fourth embodiment.

The rotator groups R1 and R3 both consist of three reciprocal rotators, arranged as QR11 and QR12, QR13, and QR31, QR32 and QR33 (in that order) in the negative direction along the X axis in the X-Y plane. Rotators QR11 and QR13 are reciprocal rotators that rotate light clockwise by 45° (hereinafter reciprocal clockwise rotator), and QR12 is a reciprocal rotator that rotates counterclockwise (hereinafter the reciprocal counterclockwise rotator).

The double refraction crystal plate BC2 selects a crystal axis so that light having its electric field tilted as much as 45° to the left from X axis will be transmitted in the positive direction of the Z axis in ordinary light, and extraordinary light will move in the positive direction of the Y axis at that time. The double refraction crystal plate BC3 selects a crystal axis so that the extraordinary light will move in the negative direction of the Y axis against the above ordinary light.

Figure 27:
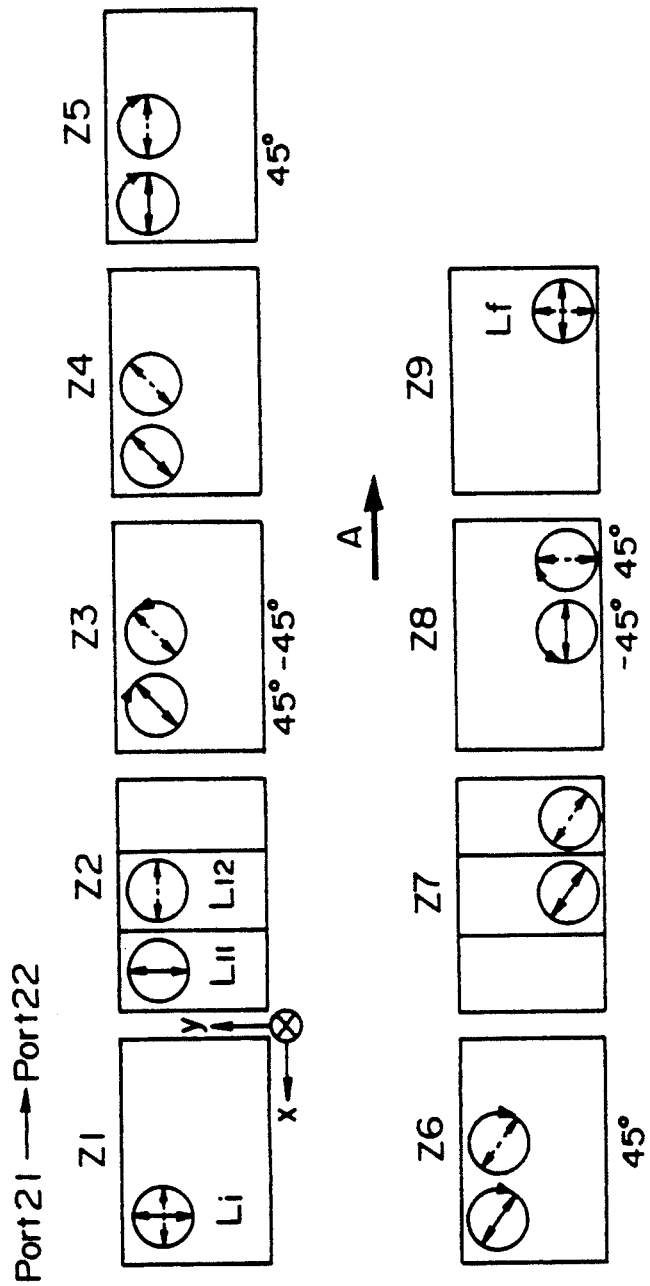
FIG. 27 is a drawing showing polarized light and spatial positions in light path A.

FIG. 27 is a view of polarization states and spatial positions of light in light path A going from the light incoming and outgoing port 21 to the light incoming and outgoing port 22 as viewed from the side of the incoming light. These states are indicated below as symbols Z1 through Z9.

Light Li injected from light incoming and outgoing port 21 is in state Z1, and is separated into light L11 and light L12 on the X-Z plane by BC1. Light L11 is ordinary light (O-ray), and light L12 is extraordinary light (E-ray). The electric fields of these lights are perpendicular, vibrating in the Y and X axis directions as shown by Z1.

The electric fields of light L11 and light L12, which are perpendicular to each other, are made parallel when they pass through the rotator group R1. This is because light L11 passes through the reciprocal clockwise rotator QR11, and light L12 passes through the reciprocal counterclockwise rotator QR12. The electric fields at this time are tilted by 45° to the left from the X axis as in polarization state Z3.

Lights L11 and L12, having their electric fields tilted by 45° to the left from the X axis, are transmitted through BC2 as ordinary light. In this case, since the spatial positions of the lights do not change, polarization state Z4 becomes identical with polarization state Z3. The two lights having passed BC2, now pass the rotator group R2. The effect of the rotator group R2 is the same as in the fourth embodiment, acting to rotate the electric fields by 90° against the light transmitted in the positive direction of Z axis. As a result, the electric fields of the two lights cross perpendicularly to polarization state Z4, as in polarization state Z6. Therefore, the two lights L11 and L12 are transmitted while moving diagonally through BC3 as ordinary light, and enter polarization state Z7.

The two lights L11 and L12, having passed BC3, now pass through rotator group R3. In this case, the electric field of light L11 moves in the X axis direction as a result of having passed through the reciprocal counterclockwise rotator QR32, and the electric field of light L12 moves in the Y axis direction as a result of having passed through the reciprocal clockwise rotator QR33 (state Z8). Therefore, the electric fields of the two lights L11 and L12 cross perpendicularly at the incoming edge face BC4a of the fourth double refraction crystal plate BC4.

Since the two lights L11 and L12, having electric fields crossed perpendicularly, are extraordinary light and ordinary light, respectively, relative to the fourth double refraction crystal plate BC4, lights L11 and L12 are spatially coincide at the edge face BC4b of the fourth double refraction crystal plate BC4 (light Lf), and are transmitted in the positive direction of the Z axis.

Figure 28:
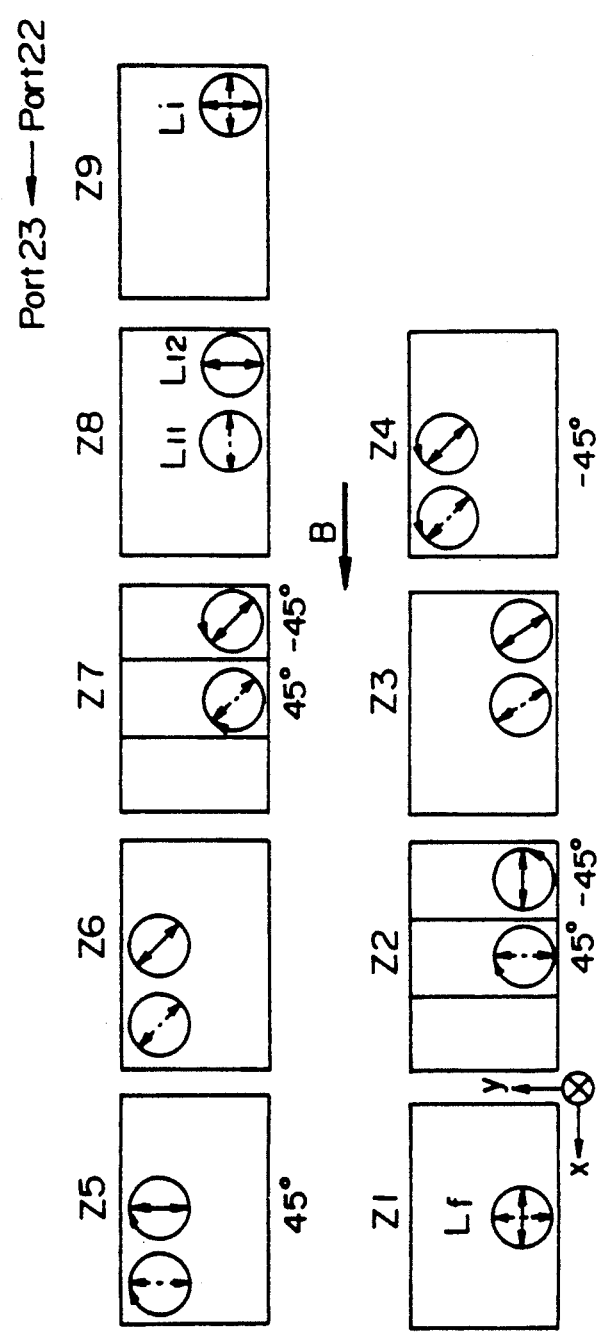
FIG. 28 is a drawing showing polarized light and spatial positions in light path B.

FIG. 28 is a view of polarized light in light path B (light transmitted in the negative direction of the Z axis) going from the light incoming and outgoing port 22 to the light incoming and outgoing port 23 as viewed from the side of the outgoing light (the side of the light incoming and outgoing port 23 side).

The polarization state of light Li injected from the light incoming and outgoing port 22 agrees with the polarization state in light path A up to the outgoing edge face BC3a of the double refraction crystal plate BC3—that is, from polarization state Z9 to Z6. This is because all of the double refraction crystal plates BC4 and BC3 and the rotator group R3 offer reciprocity.

The lights L11 and L12 in polarization state Z6 now pass through the rotator group R2. The rotator group R2 does not rotate the electric fields against the light transmitted in the negative direction of the Z axis. Therefore, the electric fields of lights L11 and L12 are tilted 45 to the right from the X axis at the incoming edge face BC2b of the double refraction crystal plate BC2 (in polarization state Z4), whereas lights are transmitted as extraordinary light through the double refraction crystal plate BC2 in the negative direction of the Z axis while moving in the negative Y direction along the electric field vibration direction (polarization state Z3).

Thereafter, the electric field of light L11 is made parallel to the Y axis when it passes through the reciprocal counterclockwise rotator QR12, and the light L12 is made parallel to the X axis when it passes through the reciprocal clockwise rotator QR13. Since the two lights L11 and L12, having electric fields crossed perpendicularly, are extraordinary light and ordinary light, respectively, relative to the first double refraction crystal plate BC1, lights L11 and L12 are spatially coincide at the edge face BC1a of the first double refraction crystal plate BC1 (light Lf), and are transmitted in the negative direction of the Z axis.

Figure 29:
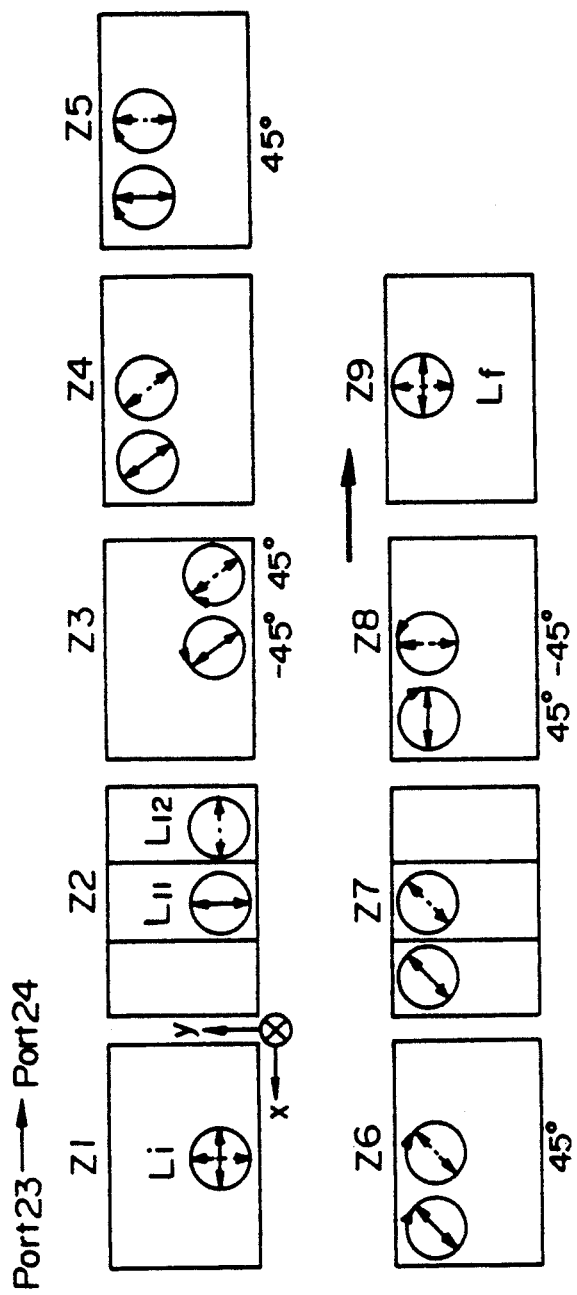
FIG. 29 is a drawing showing polarized light and spatial positions in light path C.

FIG. 29 is a view of polarized light in light path C (light transmitted in the positive direction of the Z axis) going from the light incoming and outgoing port 23 to the light incoming and outgoing port 24 as viewed from the side of the outgoing light (the side of the light incoming and outgoing port 21).

The polarization of light Li injected from the light incoming and outgoing port 23 agrees with the polarization in light path B up to the outgoing edge face BC2b of the double refraction crystal plate BC2—that is, from polarization state Z1 to Z4.

The lights L11 and L12 in polarization state Z4 now pass through the rotator group R2. The rotator group R2 rotates the electric fields by 90° against the light that is transmitted in the positive direction of the Z axis. Therefore, the electric fields of lights L11 and L12 are tilted 45° to the left from the X axis at the incoming edge face BC3a of the double refraction crystal plate BC3 (polarization state Z6), whereas the lights are transmitted as ordinary light through the double refracted crystal plate BC3 to the positive direction of the Z axis (polarization state Z3).

Thereafter, the electric field of the L11 is made parallel to X axis as a result of having passed through the reciprocal clockwise rotator QR31, and light L12 is made parallel to the Y axis as a result of having passed through the reciprocal clockwise rotator QR33. Since the two lights L11 and L12 having the electric field contents crossed perpendicularly are extraordinary light and ordinary light, respectively, relative to the fourth double refraction crystal plate BC4, lights L11 and L12 are made to spatially coincide at the edge face BC4b of the fourth double refraction crystal plate BC4 (light Lf), and are transmitted in the positive direction of the Z axis.

Figure 30:
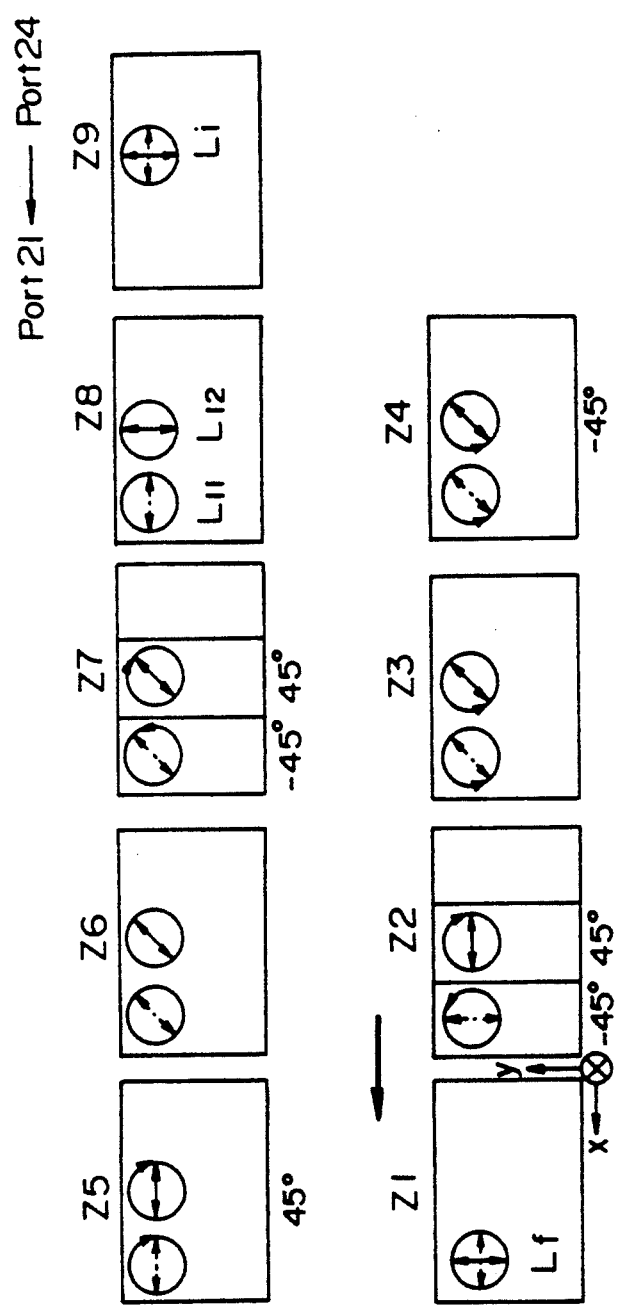
FIG. 30 is a drawing showing polarized light and spatial positions in light path D.

FIG. 30 is a view of polarized light in light path D (light transmitted in the negative direction of the Z axis) going from the light incoming and outgoing port 24 to the light incoming and outgoing port 21 as viewed from the side of the outgoing light (the side of the light incoming and outgoing port 21). The polarization of light Li injected from the light incoming and outgoing port 24 agrees with the polarization state in light path C from polarization states Z9 to Z6.

Lights L11 and L12 in polarization state Z6 pass through the rotator group R2. The rotator group R2 does not change the polarization state against the lights that are transmitted in the negative direction of the Z axis. Therefore, the electric fields are tilted 45° to the right of the X axis at the incoming edge face BC2b of the double refraction crystal plate BC2 (polarization state Z4), whereas the lights are transmitted as ordinary light through the double refraction crystal plate BC2 in the positive direction of the Z axis (polarization state Z3).

Thereafter, the electric field of light L11 is made parallel to the Y axis when it passed through the reciprocal clockwise rotator QR11, and light L12 is made parallel to the X axis when it passes through the reciprocal clockwise rotator QR13. Since the two lights L11 and L12, having electric fields crossed perpendicularly, are extraordinary light and ordinary light respectively relative to the first double refraction crystal plate BC1, lights L11 and L12 are made to coincide at the edge face BC1a of the first double refraction crystal plate BC1 (light Lf), and are transmitted in the positive direction of the Z axis.

As explained above, according to the optical circulator of the present invention, it is possible to transmit the light circularly in such a manner that light Li radiated from the light incoming and outgoing port 21 is emitted from the light incoming and outgoing port 22; light radiated from the light incoming and outgoing port 22 is emitted from the light incoming and outgoing port 23; light radiated from the light incoming and outgoing port 23 is emitted from the light incoming and outgoing port 24; and light radiated from the light incoming and outgoing port 24 is emitted from the light incoming and outgoing port 21.

Figure 31:
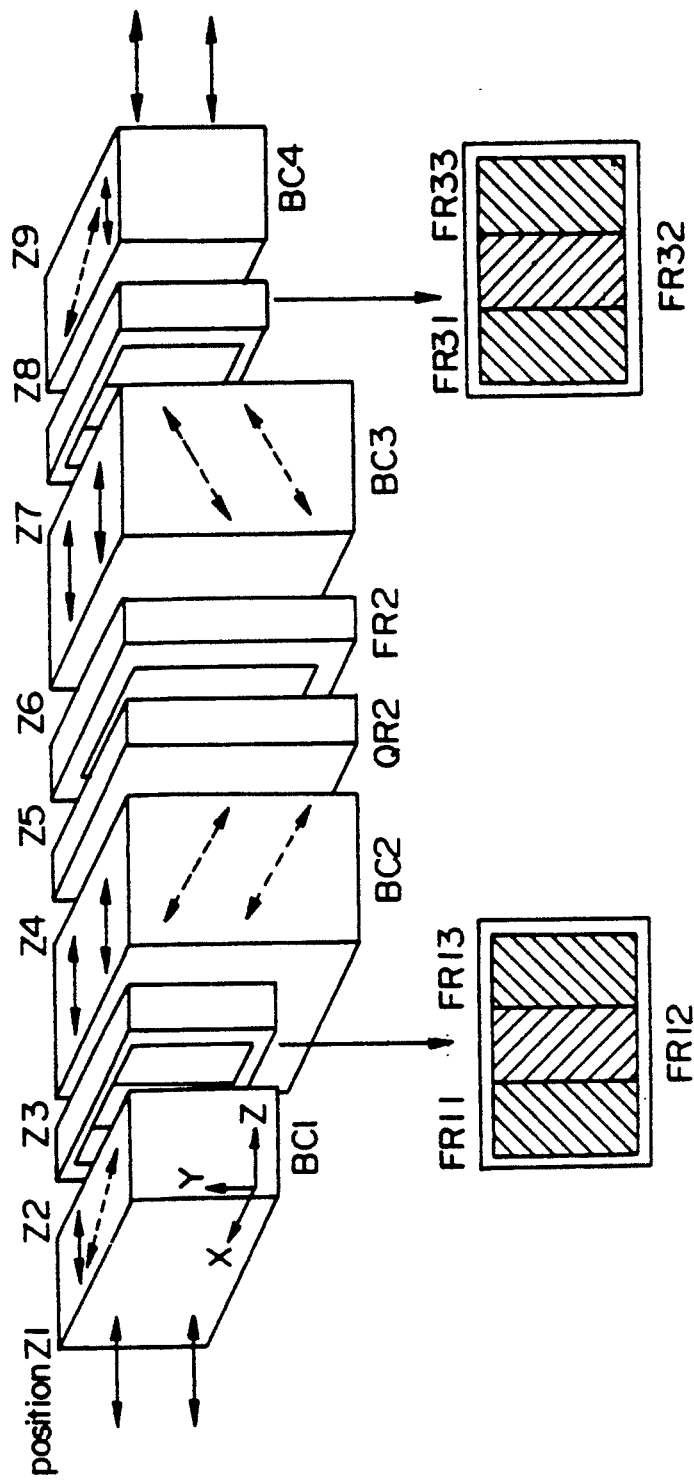
FIG. 31 is a perspective view showing a variant on the optical circulator of the fifth embodiment of the present invention.

FIG. 31 shows a variant on the above optical circulator. The difference between this optical circulator and the above optical circulator is that the rotator groups R1 and R3 are replaced with non-reciprocal rotators. The reciprocal clockwise rotators QR11 and QR13 is polarization rotator group R1 are replaced with non-reciprocal 45° clockwise rotators, and the reciprocal counterclockwise rotator QR12 is replaced with a non-reciprocal 45° counterclockwise rotator. Similarly, the reciprocal clockwise rotators QR31 and QR33 in polarization rotator group R3 are replaced with non-reciprocal 45° clockwise rotators, and the reciprocal counterclockwise rotator QR32 is replaced with a non-reciprocal 45° counterclockwise rotator. Since non-reciprocal rotators are used as a means to make the electric fields parallel and perpendicular, some discrepancies are created in the polarization states in light paths B and D, but the positions and functions of each light incoming and outgoing port do not change. It is a general practice to change the directions of a magnetic field to realize clockwise and counterclockwise rotators; but using Faraday elements, in which the directions in which the polarized waves are rotated can be opposite to each other under a particular magnetic field direction, can simplify the configuration. For example, YIG crystals and bismuth-replaced YIG crystals have opposite polarization directions even if the magnetic field direction is the same.

According to this variant, the length between ports 1 and 2 can be made shorter than in the above fifth embodiment. This is because a Faraday element requires only 3 mm thickness to rotate a polarized wave by 45°, while a quartz light rotator requires a length of about 16 mm.

Figure 32:
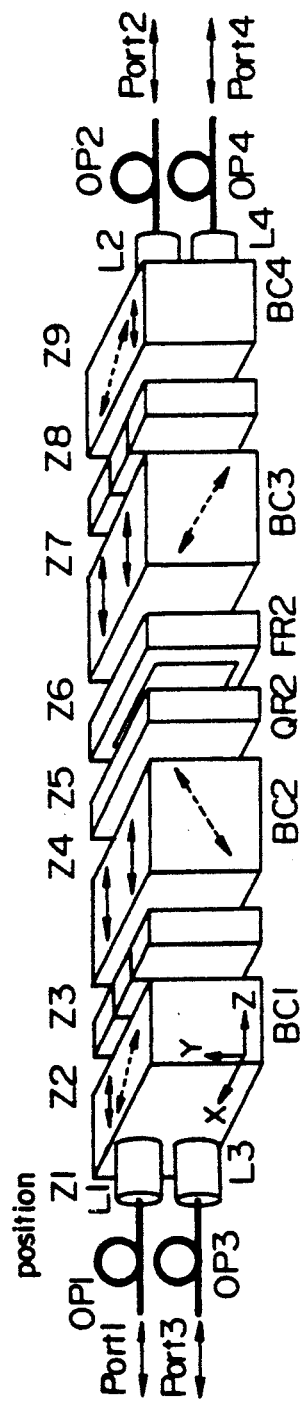
FIG. 32 is a perspective view showing a variant on the optical circulator of the fifth embodiment of the present invention.

FIG. 32 shows a variant on the above optical circulator. The difference between this optical circulator and the above optical circulator is that lenses L1 and L3 and optic fibers OP1 and OP3 are disposed coaxially between the first double refraction crystal plate BC1 and the light incoming and outgoing ports 1 and 3; moreover, the fourth double refraction crystal plate BC4, the light incoming and outgoing ports 2 and 4, and optic fibers OP2 and OP4 are also disposed coaxially.

Thus, the present invention can provide an optical circulator that transmits light circulatingly among four light incoming and outgoing ports, from port 1 to port 2, from port 2 to port 3, from port 3 to port 4, and from port 4 to port 1, without the use of polarization prisms.

What is claimed is:

1. An optical circulator for transmitting lights from the incoming and outgoing ports circularly, said optical circulator comprising:
    a first dividing and combining means for dividing a beam into two beams of orthogonal electric field vectors and for combining two beams of orthogonal electric field vectors from different paths into one on the same path; a beam path determining means for introducing a beam to a different direction depending on the direction of the electric field vector and the propagation; and a second dividing and combining means for dividing a beam into two beams of orthogonal electric field vectors and for combining two beams of orthogonal electric field vectors from different paths into one on the same path, said first dividing and combining means, said beam path determining means and said second dividing and combining means being disposed along the direction of propagation of the incoming beam at predetermined intervals;
    a first polarization rotating means between said first dividing and combining means and said beam path determining means for making two orthogonal polarization vectors parallel or the two parallel polarization vectors orthogonal to one another; and
    a second polarization rotating means between said beam path determining means and said second dividing and combining means for making two orthogonal polarization vectors parallel or the two parallel vectors orthogonal to one another.

2. An optical circulator according to claim 1, wherein said first and second dividing and combining means comprise birefringent crystal plates disposed such that each walk off direction of extraordinary beam is parallel.

3. An optical circulator according to claim 1, wherein said beam path determining means comprises a birefringent crystal plate so disposed that extraordinary beam walk off direction will be perpendicular to walk off direction in the second dividing and combining means.

4. An optical circulator according to claim 1, wherein said first and second polarization rotating means comprise reciprocal polarization rotators and non-reciprocal polarization rotators disposed along the propagation direction of the incoming beams; and the reciprocal polarization rotator is a composite of clockwise and counterclockwise rotators.

5. An optical circulator according to claim 1, wherein said first and second polarization rotating means comprise non-reciprocal polarization rotators.

6. An optical circulator according to claim 5, wherein said non-reciprocal polarization rotators are a composite of Faraday elements, in which the sense of rotation differs from each other under a particular magnetic field direction.

7. An optical circulator according to claim 1, wherein said beam path determining means includes tow birefringent crystal plates, and groups of polarization rotators between said two birefringent crystal plates, said polarization rotators having an identical rotation angle.

8. An optical circulator according to claim 7, wherein said first and second polarization rotating means comprise reciprocal polarization rotators and non-reciprocal polarization rotators disposed along the propagation direction of incoming beams; and said reciprocal polarization rotators of said first and second polarization means are a composite of two clockwise rotators and two counterclockwise rotators.

9. An optical circulator according to claim 7, wherein said first and second polarization rotating means comprise two groups of reciprocal polarization rotators disposed along the directions of the incoming beams.

10. An optical circulator according to claim 7, wherein said first and second polarization rotating means comprise two groups of non-reciprocal polarization rotators disposed along the directions of the incoming beams.

11. An optical circulator according to claim 10, wherein at least one of said two groups of non-reciprocal polarization rotators are a composite of Faraday elements in which the sense of rotation differs from each other under a particular magnetic field direction.

12. An optical circulator according to claim 7, wherein said first and second polarization rotating means comprise three reciprocal polarization rotators disposed in the same plane normal to the direction of propagation of beams; and any two rotators of said three reciprocal polarization rotators are disposed so as to rotate polarization in the same direction, the other one rotator of said three rotators being disposed so as to rotate the polarization in a direction opposite to the same direction.

13. An optical circulator according to claim 7, wherein said first and second polarization rotating means are composites of plural non-reciprocal rotators which are disposed in the same plane normal to the direction of propagation of beams.

14. An optical circulator according to claim 13, wherein said non-reciprocal polarization rotators are a composite of Faraday elements in which the sense of rotation differs from each other under a particular magnetic field direction.

* * * * *

UNITED STATES PATENT AND TRADEMARK OFFICE
CERTIFICATE OF CORRECTION

PATENT NO. : 5,204,771
DATED : April 20, 1993
INVENTOR(S) : Masafumi Koga

It is certified that error appears in the above-indentified patent and that said Letters Patent is hereby corrected as shown below:

Claim 7, column 26, line 32, change "tow" to --two--.

Signed and Sealed this

Twenty-sixth Day of April, 1994

Attest:

BRUCE LEHMAN

Attesting Officer    Commissioner of Patents and Trademarks